United States Patent
Kimura et al.

(10) Patent No.: US 11,243,459 B2
(45) Date of Patent: Feb. 8, 2022

(54) IMAGE PROJECTION APPARATUS AND IMAGE PROJECTION METHOD

(71) Applicants: Yuji Kimura, Tokyo (JP); Toyoki Tanaka, Tokyo (JP); Motoi Komatsu, Tokyo (JP)

(72) Inventors: Yuji Kimura, Tokyo (JP); Toyoki Tanaka, Tokyo (JP); Motoi Komatsu, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 579 days.

(21) Appl. No.: 16/156,235

(22) Filed: Oct. 10, 2018

(65) Prior Publication Data
US 2019/0129294 A1    May 2, 2019

(30) Foreign Application Priority Data
Nov. 1, 2017 (JP) .............................. JP2017-211586

(51) Int. Cl.
G03B 21/20 (2006.01)
H04N 9/31 (2006.01)

(52) U.S. Cl.
CPC ..... *G03B 21/2066* (2013.01); *G03B 21/2033* (2013.01); *H04N 9/3129* (2013.01); *H04N 9/3194* (2013.01)

(58) Field of Classification Search
CPC ............ G03B 21/2066; G03B 21/2033; H04N 9/3129; H04N 9/3194
(Continued)

(56) References Cited

U.S. PATENT DOCUMENTS

| 4,513,316 A | * | 4/1985 | Kobayashi | ............. G01N 21/88 |
| | | | | 348/133 |
| 4,962,981 A | * | 10/1990 | Murakami | ........... H04N 1/1135 |
| | | | | 359/217.1 |

(Continued)

FOREIGN PATENT DOCUMENTS

| EP | 2674933 | 12/2013 |
| JP | 2002-365568 | 12/2002 |

(Continued)

OTHER PUBLICATIONS

Extended European search report for European Patent Application No. 18201380.5 dated Mar. 21, 2019.

(Continued)

*Primary Examiner* — Jerry L Brooks
(74) *Attorney, Agent, or Firm* — IPUSA, PLLC

(57) ABSTRACT

An image projection apparatus includes a light irradiation device configured to irradiate a laser beam, an optical scan device configured to deflect the laser beam to make an optical scan, and project an image on a display region, an optical sensor arranged outside the display region, and including a first light receiving region and a second light receiving region that are arranged at different positions along a vertical scanning direction of the optical scan, and a deflection angle controller. The deflection angle controller corrects a deflection angle in the vertical scanning direction of the optical scan device, based on a number of times the laser beam is detected by the first light receiving region and a number of times the laser beam is detected by the second light receiving region.

23 Claims, 17 Drawing Sheets

(58) Field of Classification Search
USPC .......................................................... 353/98
See application file for complete search history.

(56) References Cited

U.S. PATENT DOCUMENTS

| | | |
|---|---|---|
| 2003/0015652 A1 | 1/2003 | Kandori et al. |
| 2010/0033691 A1 | 2/2010 | Hung et al. |
| 2012/0275001 A1 | 11/2012 | Ishibashi |
| 2017/0180690 A1* | 6/2017 | Jackson ................ G01J 1/0466 |

FOREIGN PATENT DOCUMENTS

| | | |
|---|---|---|
| WO | 2011/065219 | 6/2011 |
| WO | 2012/120589 | 9/2012 |

OTHER PUBLICATIONS

Office Action dated Jul. 6, 2021 with respect to the corresponding Japanese Patent Application No. 2017-211586.

* cited by examiner

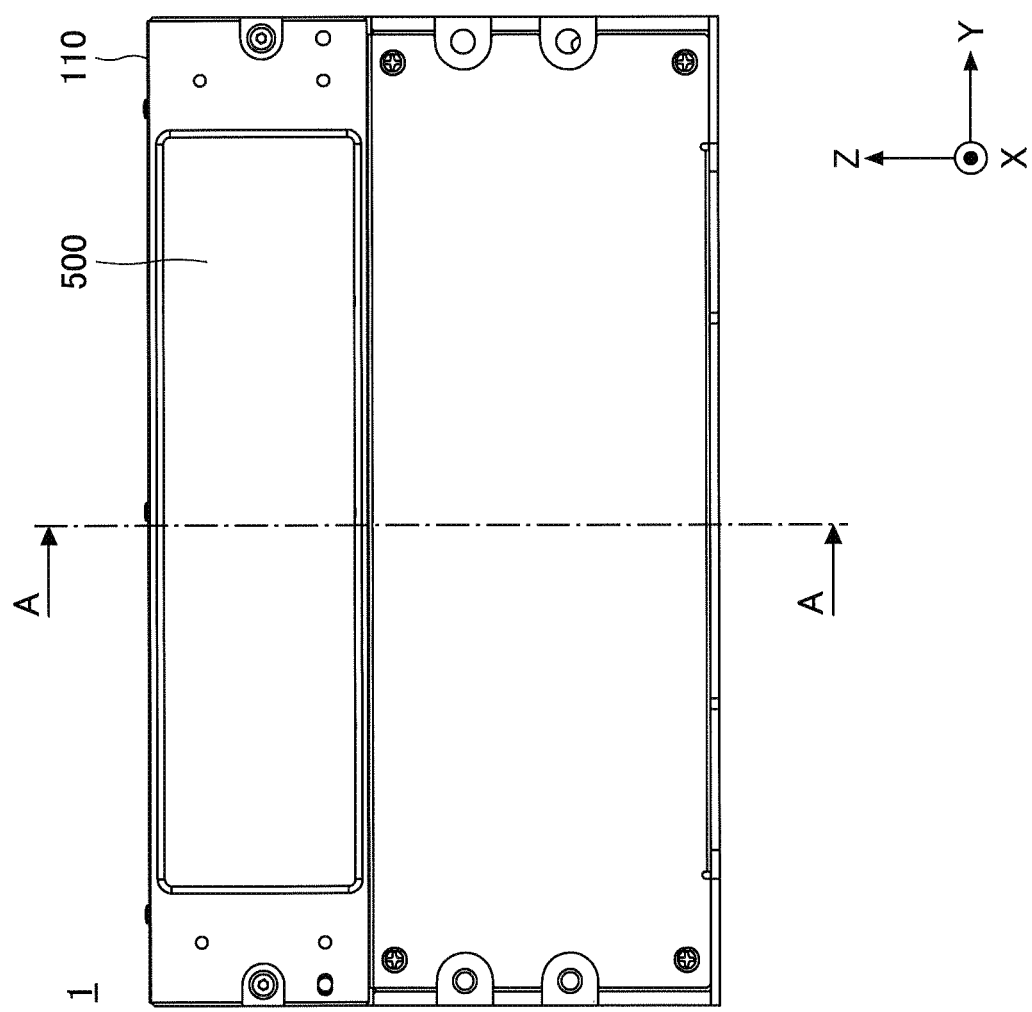

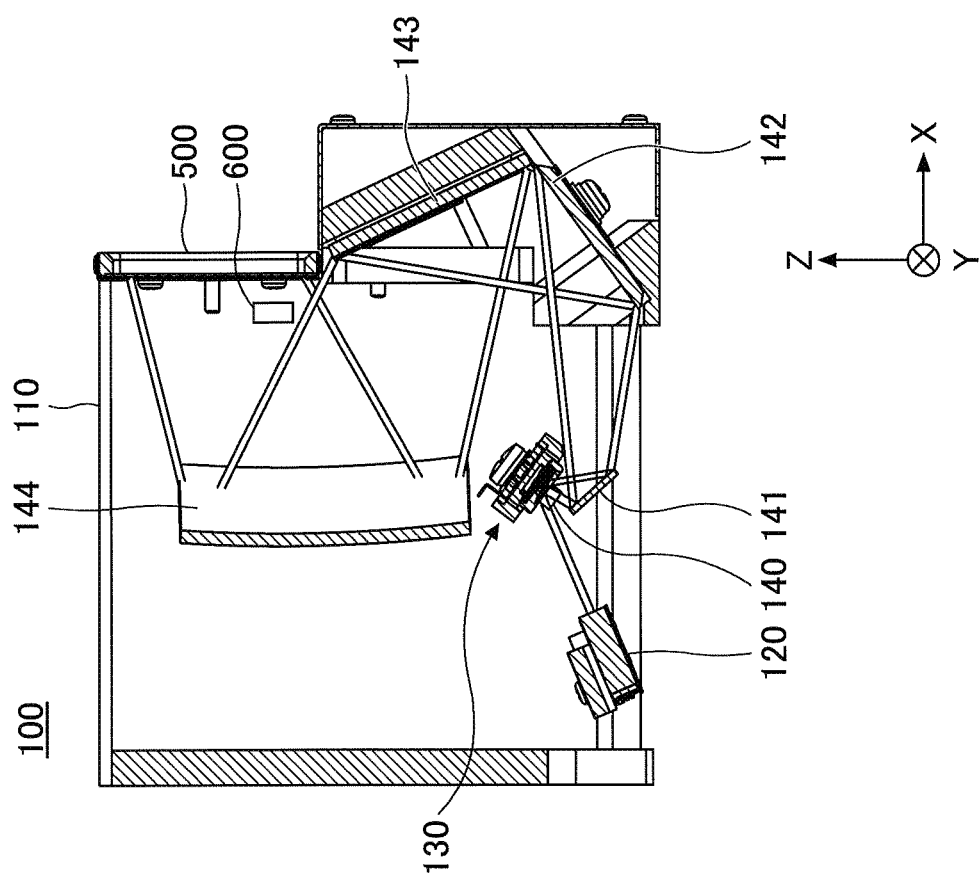

FIG.7

| STATE | DETECTION NUMBER OF PD 620 | DETECTION NUMBER OF PD 610 | CORRECTION METHOD |
|---|---|---|---|
| 1 | SAME | SAME | NO CORRECTION |
| 2 | SAME | LARGE | INCREASE DEFLECTION ANGLE |
| 3 | SAME | SMALL | DECREASE DEFLECTION ANGLE |
| 4 | LARGE | SAME | DECREASE DEFLECTION ANGLE |
| 5 | LARGE | LARGE | NOTIFY ERROR |
| 6 | LARGE | SMALL | DECREASE DEFLECTION ANGLE |
| 7 | SMALL | SAME | INCREASE DEFLECTION ANGLE |
| 8 | SMALL | LARGE | INCREASE DEFLECTION ANGLE |
| 9 | SMALL | SMALL | RETURN TO COARSE ADJUSTMENT |

FIG.9

| CONDITIONS | | JUDGMENT VALUES | |
|---|---|---|---|
| SUM | DIFFERENCE | CHANGE IN DEFLECTION ANGLE | PHASE ERROR |
| ○ | ○ | no | no |
| ○ | × | no | yes |
| × | ○ | yes | no |
| × | × | yes | yes |

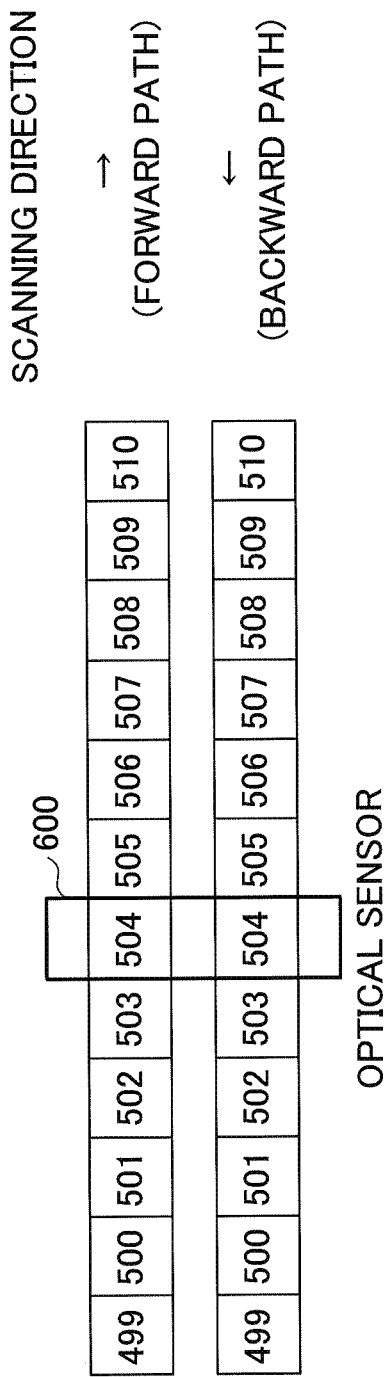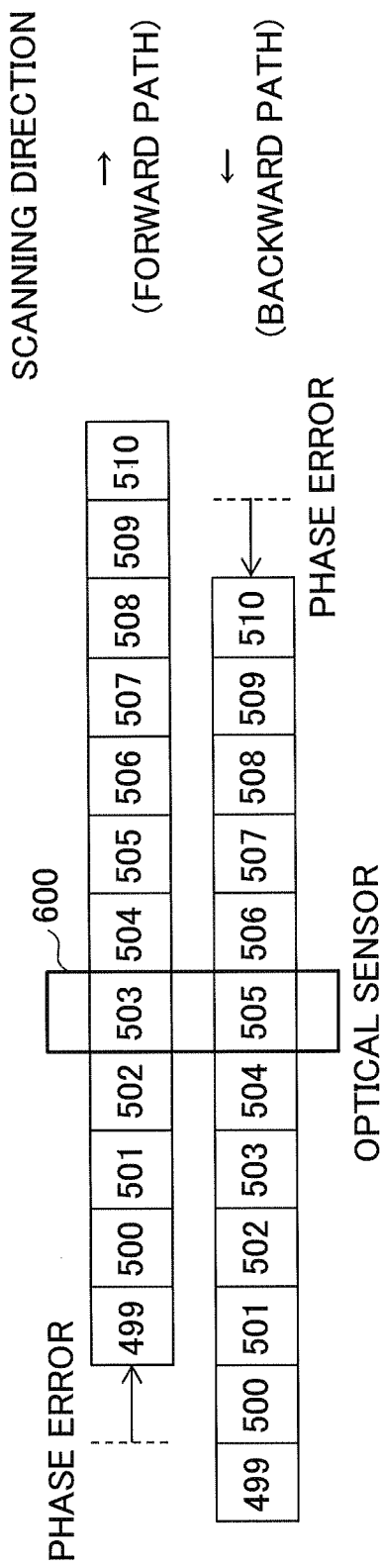

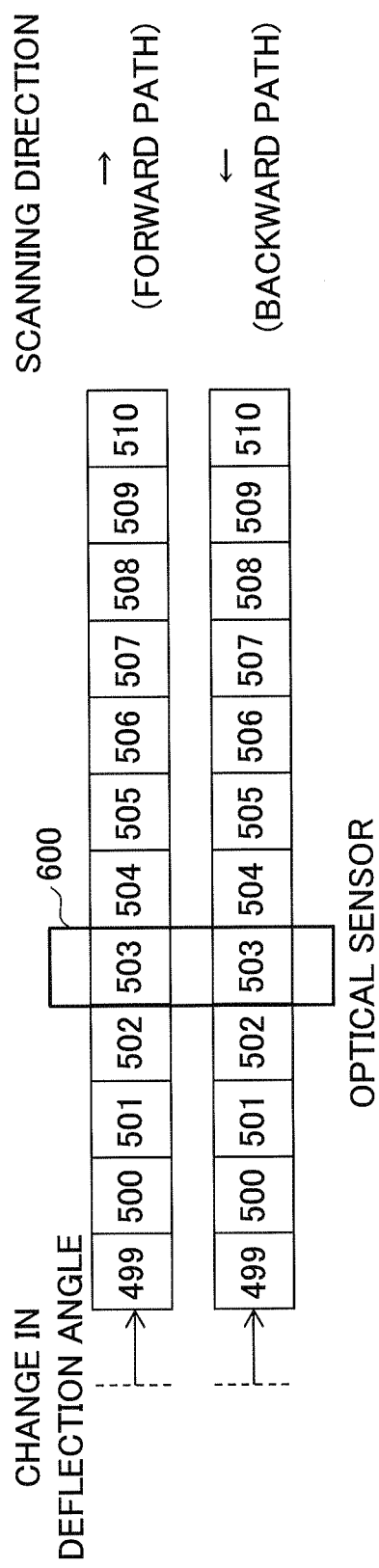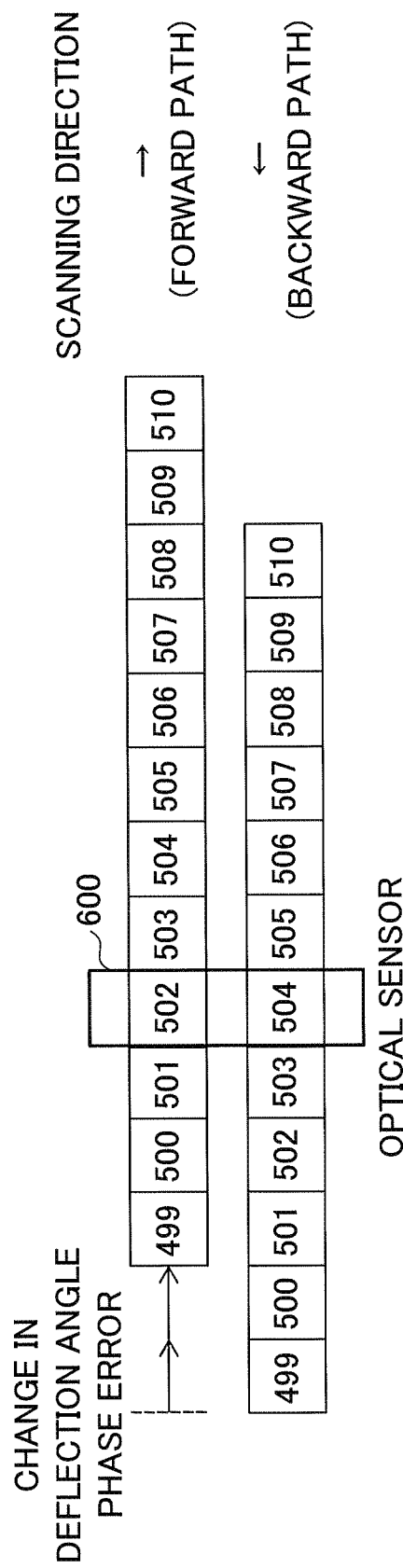

IMAGE PROJECTION APPARATUS AND IMAGE PROJECTION METHOD

CROSS-REFERENCE TO RELATED APPLICATIONS

This application is based on and claims priority to Japanese Patent Application No. 2017-211586 filed on Nov. 1, 2017, the entire contents of which are incorporated herein by reference.

BACKGROUND OF THE INVENTION

1. Field of the Invention

The present invention relates to an image projection apparatus and an image projection method.

2. Description of the Related Art

Conventionally, a known image projection apparatus projects an image on a screen by causing a laser beam to perform a two-dimensional scan. Such an image projection apparatus may sometimes be referred to as a laser projector. In such an image projection apparatus, a MEMS (Micro Electro Mechanical System) mirror is driven to reflect the laser beam, and cause the laser beam to perform the two-dimensional scan by successively changing a reflecting direction of the laser beam.

Generally, the image projection apparatus uses a relatively high resonance frequency to horizontally drive the MEMS mirror. However, when the MEMS mirror is driven at the relatively high resonance frequency, a phase error is generated between a driving signal and a displacement of the MEMS mirror. In a case in which the phase error is generated, a phase error is also generated in a horizontal scanning direction of a projection image that is projected onto the screen. Hence, techniques have been conventionally proposed to reduce the phase error in the horizontal scanning direction.

As an example, Japanese Laid-Open Patent Publication No. 2002-365568 proposes a method of reducing a synchronization error between horizontal and vertical scans.

In the image projection apparatus using the MEMS mirror, a change in a deflection angle of the MEMS mirror may occur due to effects of temperature, pressure, or the like, in addition to the phase error in the horizontal scanning direction. When the deflection angle of the MEMS mirror changes, the projection image projected onto the screen may vary in size.

The conventional techniques may be capable of detecting and correcting the phase error in the horizontal scanning direction. However, the conventional techniques cannot correct a change in the deflection angle in the horizontal scanning direction, or a change in the deflection angle in the vertical scanning direction. Hence, according to the conventional techniques, it is difficult to improve an accuracy of an irradiating position of the laser beam.

SUMMARY OF THE INVENTION

Embodiments of the present invention can provide an image projection apparatus and an image projection method, which can improve the accuracy of the irradiating position of the laser beam.

According to one aspect of embodiments of the present invention, an image projection apparatus including a light irradiation device configured to irradiate a laser beam, an optical scan device configured to deflect the laser beam to make an optical scan, and project an image on a display region, an optical sensor arranged outside the display region, and including a first light receiving region and a second light receiving region that are arranged at different positions along a vertical scanning direction of the optical scan, and a deflection angle controller configured to correct a deflection angle in the vertical scanning direction of the optical scan device, based on a number of times the laser beam is detected by the first light receiving region and a number of times the laser beam is detected by the second light receiving region.

Other objects and further features of the present invention will be apparent from the following detailed description when read in conjunction with the accompanying drawings.

BRIEF DESCRIPTION OF THE DRAWINGS

FIG. 1A and FIG. 1B are diagrams schematically illustrating a structure of an example of an image projection apparatus in a first embodiment;

FIG. 7 is a diagram illustrating an example of a correction table in the first embodiment;

FIG. 9 is a diagram illustrating an example of a judgment table in the first embodiment;

FIG. 13 is a diagram illustrating a first example of a correction method performed by the horizontal correction circuit;

FIG. 14 is a diagram illustrating a second example of the correction method performed by the horizontal correction circuit;

FIG. 15 is a diagram illustrating a third example of the correction method performed by the horizontal correction circuit;

FIG. 16 is a diagram illustrating a fourth example of the correction method performed by the horizontal correction circuit;

DESCRIPTION OF THE PREFERRED EMBODIMENTS

Figure 2:
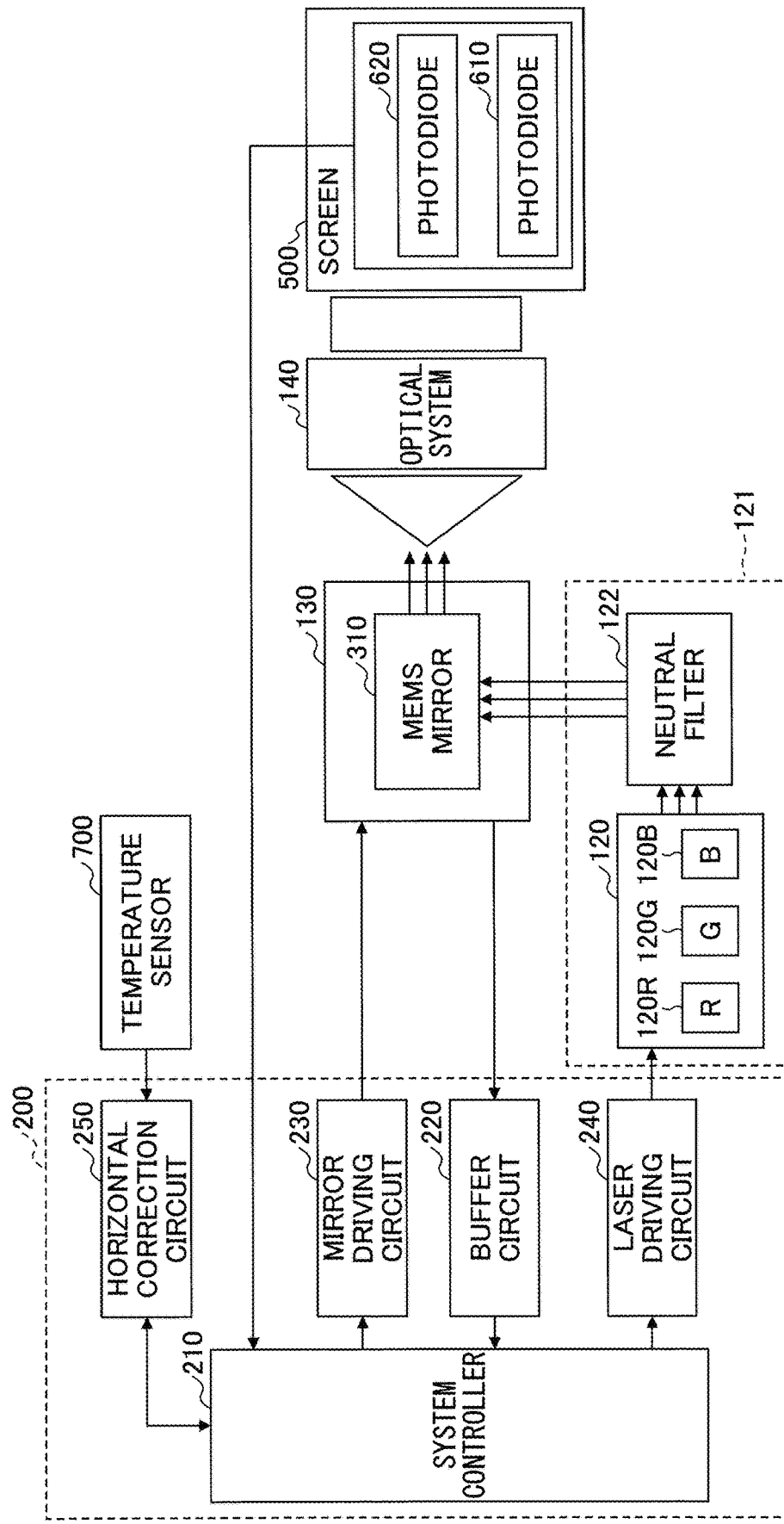
FIG. 2 is a diagram illustrating the structure of the example of the image projection apparatus in the first embodiment.

Embodiments and modifications of an image projection apparatus and an image projection method according to the present invention will be described, by referring to the drawings.

First Embodiment

A first embodiment will be described by referring to the drawings. FIG. 1A and FIG. 1B are diagrams schematically illustrating a structure of an example of an image projection apparatus in the first embodiment. FIG. 1A illustrates a front view of an external appearance of the image projection apparatus, and FIG. 1B illustrates a cross sectional view of an inner structure of the image projection apparatus along a line A-A in FIG. 1A.

As illustrated in FIG. 1A, an image projection apparatus 100 in this embodiment includes a housing (or casing) 110, and a screen 500 provided in front of the housing 110. The front of the housing 110 is in a positive X-axis direction in FIG. 1A and FIG. 1B. The screen 500 is an example of a projection surface. In addition, as illustrated in FIG. 1B, the image projection apparatus 100 includes, inside the housing 110, a LD (Laser Diode) module 120, an optical scan module 130, and an optical system 140. The LD module 120 and the optical scan module 130 are hardware modules, or hardware devices. In the example illustrated in FIG. 1B, the optical system 140 includes a reflection mirror 141, a reflection mirror 142, a reflection mirror 143, and a concave mirror 144.

The image projection apparatus 100 having the structure described above projects an image onto the screen 500, by reflecting a laser beam emitted from the LD module 120 by the optical scan module 130 and the optical system 140, and cause the laser beam to irradiate and perform an optical scan on the screen 500. The optical scan is performed by driving a MEMS mirror 310 of the optical scan module 130, illustrated in FIG. 2 and FIG. 3 which will be described later, to successively change a reflecting direction of the laser beam.

The image projection apparatus 100 may be a head-up display for a vehicle, for example. In this case, the image projection apparatus 100 may be embedded within an instrument panel of the vehicle, in front of a driver's seat, for example. Further, the image projection apparatus 100 may display, on a front windshield of the vehicle, a display image of various kinds of information, including a speedometer, a route guidance, or the like projected onto the screen 500. In this case, the display image displayed on the front windshield of the vehicle is visible to a driver of the vehicle.

Next, a more detailed description will be given of the image projection apparatus 100 in this embodiment, by referring to FIG. 1. FIG. 2 is a diagram illustrating the structure of the example of the image projection apparatus in the first embodiment.

The image projection apparatus 100 in this embodiment includes a circuit module 200, a light source module 121, the optical scan module 130, the optical system 140, the screen 500, an optical sensor (or photosensor) 600, and a temperature sensor 700. The circuit module 200 and the light source module 121 are hardware modules, or hardware devices.

The circuit module 200 controls the light source module 121 and the optical scan module 130. The light source module 121 irradiates the laser beam. The optical scan module 130 includes the MEMS mirror 310, and causes the laser beam, irradiated from the light source module 121, to perform the optical scan. A structure of the optical scan module 130 will be described later in conjunction with FIG. 3.

The optical system 140 projects onto the screen 500, the laser beam that is caused to perform the optical scan by the optical scan module 130. The optical sensor 600 detects the laser beam projected onto the screen 500.

The temperature sensor 700 detects an ambient temperature of the image projection apparatus 100. In this embodiment, the temperature sensor 700 is used when including the temperature as a variable factor of a processed result of a horizontal correction circuit 250 which will be described later. In addition, in a case in which a photodiode is used for the optical sensor 600, for example, a delay corresponding to a reaction time is generated from a time when the laser beam passes through the photodiode until a time when a signal is output from the photodiode.

The delay corresponding to the reaction time varies according to the ambient temperature of the photodiode. For this reason, the ambient temperature of the photodiode may be detected by the temperature sensor 700, to correct the delay corresponding to the reaction time. In this case, the temperature sensor 700 is preferably provided adjacent to the photodiode.

Next, the image projection apparatus 100 in this embodiment will be described in more detail.

The circuit module 200 in this embodiment includes a system controller 210, a buffer circuit 220, a mirror driving circuit 230, a laser driving circuit 240, and the horizontal correction circuit 250.

The system controller 210 supplies an angle control signal to the mirror driving circuit 230. In addition, the system controller 210 supplies a digital video signal to the laser driving circuit 240. In this embodiment, the system controller 210 corrects a deflection angle in the vertical scanning direction of the MEMS mirror 310. Details of the system controller 210 will be described later.

When the buffer circuit 220 receives a sensor signal or the like output from the optical scan module 130, the buffer circuit 220 outputs the sensor signal or the like to the system controller 210.

Figure 3:
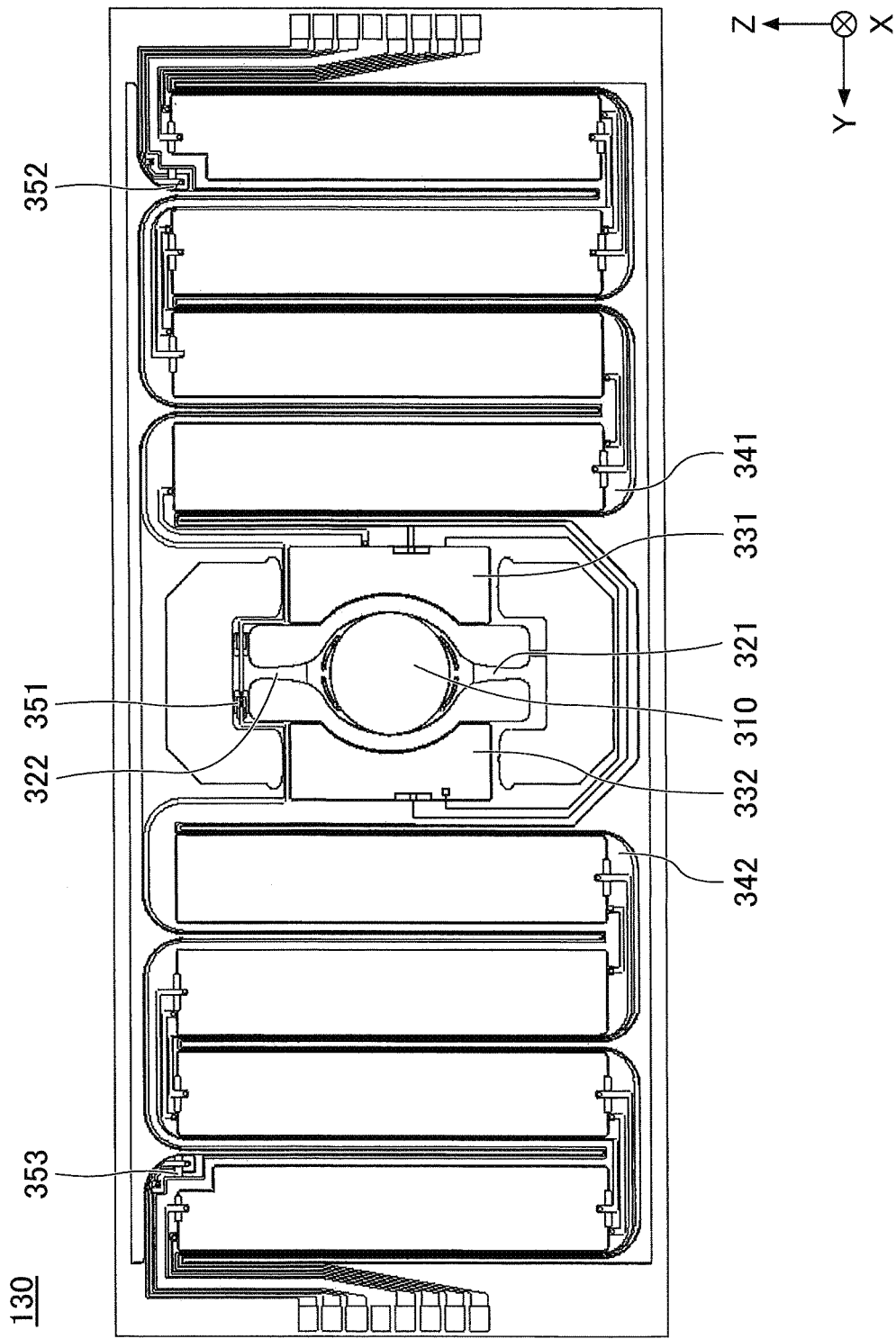
FIG. 3 is a diagram for explaining an optical scan module in the first embodiment.

Based on the angle control signal from the system controller 210, the mirror driving circuit 230 supplies driving signals to piezoelectric actuators 331, 332, 341, and 342 which will be described later in conjunction with FIG. 3, to horizontally drive and vertically drive the MEMS mirror 310.

Based on the digital video signal from the system controller 210, the laser driving circuit 240 supplies a driving current to the light source module 121 so that the light source module 121 emits the laser beam.

The horizontal correction circuit 250 corrects the deflection angle in the horizontal scanning direction of the MEMS mirror 310, and a phase error. The phase error represents an error in the horizontal scanning direction of the image projected onto the screen 500 that occurs due to a phase difference between the driving signal supplied to the MEMS mirror 310 and a displacement of the MEMS mirror 310. Details of the horizontal correction circuit 250 will be described later.

In this embodiment, the light source module 121 includes the LD module 120, and a neutral filter (or neutral-density filter) 122. The LD module 120 is an example of a light irradiation device, and includes a laser diode 120R, a laser diode 120G, and a laser diode 120B.

The laser diodes 120R, 120G, and 120B emit laser beams based on the driving current supplied from the system controller 210.

The laser diode 120R is a semiconductor laser, for example, and emits a red laser beam having a wavelength λR of 640 nm, for example. The laser diode 120G is a semiconductor laser, for example, and emits a green laser beam having a wavelength λG of 530 nm, for example. The laser diode 120B is a semiconductor laser, for example, and emits a blue laser beam having a wavelength λB of 445 nm, for example. The laser beams having the respective wavelengths and emitted from the laser diodes 120R, 120G, and 120B are combined by a dichroic mirror or the like, and a combined laser beam is supplied to the neutral filter 122. The neutral filter 122 dims the combined laser beam to a predetermined light quantity, and supplies the dimmed, combined laser beam to the MEMS mirror 310 of the optical scan module 130.

In this embodiment, the optical scan module 130 horizontally drives and vertically drives the MEMS mirror 310, to cause the laser beam to perform the scan in the horizontal scanning direction and the vertical scanning direction.

The reflecting direction of laser beam supplied to the MEMS mirror 310 changes as the MEMS mirror 310 is horizontally driven and vertically driven, and the laser beam is further reflected repeatedly by the optical system 140, before being irradiated on the screen 500. Hence, the laser beam performs the optical scan on the screen 500, to project the image on the screen 500.

The optical system 140 and the screen 500 in this embodiment are as illustrated in FIG. 1A and FIG. 1B.

In this embodiment, the optical sensor 600 is provided on the screen 500, and detects the laser beam irradiated on the optical sensor 600 in each of a forward path in a first direction and a backward path in a second direction of the horizontal scan of the laser beam.

In addition, the optical sensor 600 may include a plurality of photodiodes. In this embodiment, the optical sensor 600 includes photodiodes 610 and 620, for example. This embodiment corrects both the deflection angle in the horizontal scanning direction of the MEMS mirror 310 and the phase error, and corrects the deflection angle in the vertical scanning direction of the MEMS mirror 310, based on laser beam detection results of the photodiodes 610 and 620. Details of the optical sensor 600 will be described later.

Next, the optical scan module 130 in this embodiment will be described, by referring to FIG. 3. FIG. 3 is a diagram for explaining the optical scan module in the first embodiment.

In this embodiment, the optical scan module 130 includes the MEMS mirror 310, a torsion bar 321, a torsion bar 322, the piezoelectric actuator 331, the piezoelectric actuator 332, the piezoelectric actuator 341, the piezoelectric actuator 342, a displacement sensor 351, a displacement sensor 352, and a displacement sensor 353.

The MEMS mirror 310 is an example of an optical scan device. Both sides of the MEMS mirror 310 are rotatably supported by the pair of torsion bars 321 and 322. The pair of piezoelectric actuators 331 and 332 are arranged in a Y-axis direction that is perpendicular to a Z-axis direction in which the pair of torsion bars 321 and 322 are arranged in FIG. 3, to sandwich the MEMS mirror 310 between the pair of piezoelectric actuators 331 and 332. Each of the piezoelectric actuators 331 and 332 has a laminated structure in which a plate-shaped elastic body and a piezoelectric element are laminated. The piezoelectric actuators 331 and 332 can rotate, that is, horizontally drive, the MEMS mirror 310 in the horizontal direction indicated by the Y-axis direction in, FIG. 3, when the piezoelectric element is flexibly deformed in response to receiving a driving voltage. The optical scan module 130 can cause the laser beam to perform the horizontal scan at a high speed, by horizontally driving the MEMS mirror 310 by driving at the resonance frequency.

The piezoelectric actuators 341 and 342 are arranged on the outer sides of the piezoelectric actuators 331 and 332, respectively. Each of the piezoelectric actuators 341 and 342 has a laminated structure in which a plate-shaped elastic body and a piezoelectric element are laminated. The piezoelectric actuators 341 and 342 can rotate, that is, vertically drive, the MEMS mirror 310 in the vertical direction indicated by the Z-axis direction in FIG. 3, when the piezoelectric element is flexibly deformed in response to receiving a driving voltage. The MEMS mirror 310 is vertically driven by driving at a non-resonance frequency, such as driving by a sawtooth wave, for example.

The displacement sensor 351 detects an inclination in the horizontal direction of the MEMS mirror 310. The displacement sensors 352 and 353 detect an inclination in the vertical direction of the MEMS mirror 310. Detection signals from the plurality of displacement sensors 351, 352, and 353 are fed back to the system controller 210 via the buffer circuit 220, for example.

The detection signal from the displacement sensor 351 may be used to determine an emission (or launch) timing of the laser beam, for example. In addition, the detection signals from the displacement sensors 352 and 353 may be used to control the deflection angle in the vertical direction of the MEMS mirror 310 to a desired range, to correct the projection image, or the like, for example.

More particularly, the detection signals from the displacement sensors 352 and 353 may be used for a coarse adjustment to roughly adjust the deflection angle of the MEMS mirror 310 in the vertical scanning direction, and the detection signal from the displacement sensor 351 may be used for a coarse adjustment to roughly adjust the deflection angle of the MEMS mirror 310 in the horizontal scanning direction, as will be described later.

Figure 4:
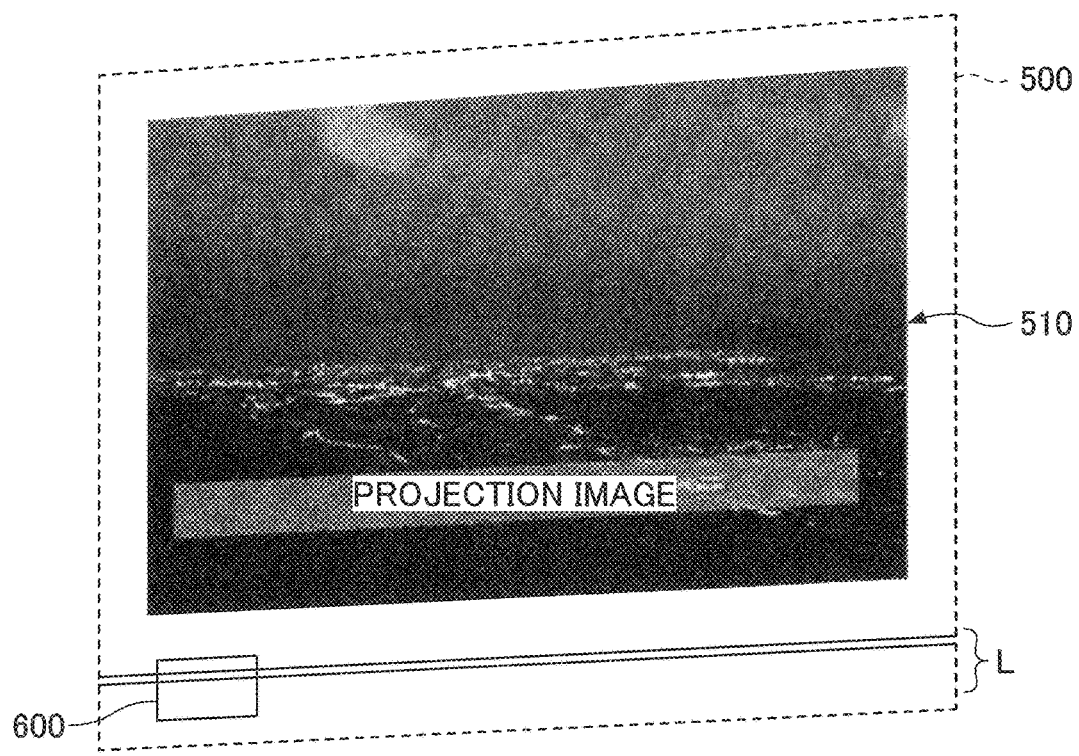
FIG. 4 is a diagram for explaining an arrangement of an optical sensor on a screen.

Next, an installing position of the optical sensor 600 in this embodiment will be described in conjunction with FIG. 4. FIG. 4 is a diagram for explaining an arrangement of the optical sensor on the screen.

The optical sensor 600 in this embodiment is arranged in a blanking area outside a display region 510 of the image on the screen 500. More particularly, the optical sensor 600 is arranged in the blanking area on a lower left of the display region 510. The screen 500 is a scan region scanned by the laser beam. On the other hand, the display region 510 is a projection region where the image input to the image projection apparatus 100 is projected.

In the example illustrated in FIG. 4, the optical sensor 600 is arranged at a position on the lower left of the display region 510, however, the position of the optical sensor 600 is not limited to such a position. For example, the optical sensor 600 may be arranged in the blanking area below the display region 510, at a central part along the horizontal scanning direction of the display region 510. In addition, the optical sensor 600 may be arranged in a blanking area above the display region 510. Further, the optical sensor 600 may be arranged in a blanking area on the left or right of the display region 510.

The optical sensor 600 in this embodiment uses a laser beam L that scans the blanking area as a reference light beam, to correct both the deflection angle in the horizontal scanning direction and the phase error, and to correct the deflection angle in the vertical scanning direction. In addition, the optical sensor 600 in this embodiment detects a plurality of reference light beams L that are irradiated at different positions along the vertical scanning direction.

In this embodiment, one reference light beam L is irradiated for every one frame, for example, and scans the screen 500 in the horizontal direction. The number of reference light beams L irradiated on the blanking area in this embodiment may be approximately 20 using approximately 20 frames, for example.

Figure 5:
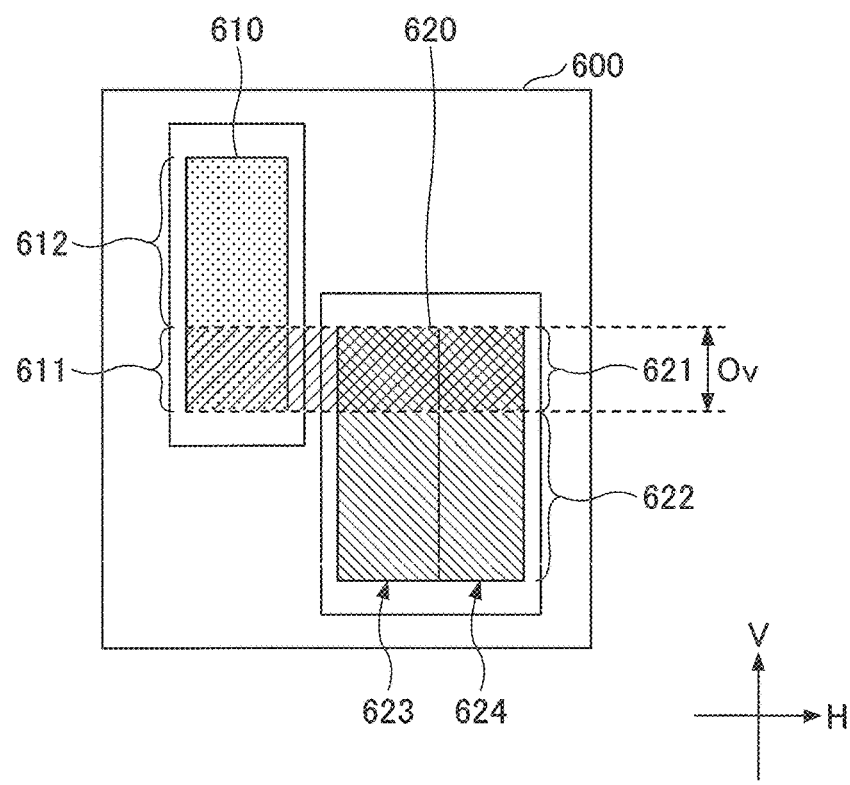
FIG. 5 is a diagram for explaining a structure of the optical sensor in the first embodiment.

Next, the optical sensor 600 in this embodiment will be described, by referring to FIG. 5. FIG. 5 is a diagram for explaining a structure of the optical sensor in the first embodiment.

The optical sensor 600 in this embodiment includes the photodiode 610 forming a first light receiving region, and the photodiode 620 forming a second light receiving region.

In the optical sensor 600 in this embodiment, the photodiode 610 and the photodiode 620 are arranged to overlap in the vertical scanning direction of the MEMS mirror 310. In other words, the optical sensor 600 in this embodiment is a photodetector including the first light receiving region and the second light receiving region that are arranged at different positions along the vertical scanning direction.

In FIG. 5, an arrow V indicates the vertical scanning direction of the MEMS mirror 310, and an arrow H indicates the horizontal scanning direction of the MEMS mirror 310.

In this embodiment, the photodiode 610 and the photodiode 620 are used to correct the deflection angle in the vertical scanning direction V of the MEMS mirror 310, and the photodiode 610 is used to correct both the deflection angle in the horizontal scanning direction H of the MEMS mirror 312 and the phase error.

In the optical sensor 600 in this embodiment, the photodiode 610 and the photodiode 620 are arranged to overlap each other by a width Ov along the vertical scanning direction V. In the following description, a region of the photodiode 610 corresponding to the width Ov is referred to as an overlapping region 611, and a region of the photodiode 620 corresponding to the width Ov is referred to as an overlapping region 621.

The overlapping region 611 and the overlapping region 621 in this embodiment are the light receiving regions scanned by the plurality of reference light beams L that are irradiated at different positions along the vertical scanning direction V. When one reference light beam L scans the overlapping region 611 and the overlapping region 621, each of the overlapping regions 611 and 621 detects this one reference light beam L.

In addition, when the reference light beam L scans a region 612 other than the overlapping region 611 of the photodiode 610, the photodiode 620 does not detect this reference light beam L. Similarly, when the reference light beam L scans a region 622 other than the overlapping region 621, the photodiode 610 does not detect this reference light beam L.

Accordingly, when the deflection angle in the vertical scanning direction of the MEMS mirror 310 changes, one of the number of times the reference light beam is detected by the region 612 of the photodiode 610, the number of times the reference light beam is detected by the overlapping regions 611 and 621, and the number of times the reference light beam is detected by the region 622 changes. Hence, this embodiment corrects the deflection angle in the vertical scanning direction of the MEMS mirror 310, according to the change in one of these numbers of times the reference light beam is detected.

In this embodiment, the overlapping region 611 and the overlapping region 621 are scanned by the plurality of reference light beams. However, the overlapping region 611 and the overlapping region 621 may be scanned by a single reference light beam instead of being scanned by the plurality of reference light beams.

In addition, the photodiode 610 and the photodiode 620 in this embodiment have light receiving regions that are arranged at positions preferably continuous along the vertical scanning direction, however, the light receiving regions of the photodiode 610 and the photodiode 620 do not necessarily have to be arranged at positions continuous along the vertical scanning direction. In other words, the photodiode 610 and the photodiode 620 in this embodiment need only be arranged at mutually different positions along the vertical scanning direction, and the photodiode 610 does not necessarily have to include the overlapping region 611, and the photodiode 620 does not necessarily have to include the overlapping region 621.

In a case in which the light receiving regions formed by the photodiode 610 and the photodiode 620 are not continuous along the vertical scanning direction, the deflection angle in the vertical scanning direction of the MEMS mirror 310 may be corrected according to changes in the number of times the reference light beam is detected by the first light receiving region formed by the photodiode 610, and the number of times the reference light beam is detected by the second light receiving region formed by the photodiode 620.

In addition, the photodiode 620 in this embodiment may include a plurality of photodiodes 623 and 624 that are arranged in the horizontal scanning direction, for example.

In this embodiment, the plurality of photodiodes 623 and 624 may be arranged adjacent to each other in the horizontal scanning direction. In other words, it is possible to improve the accuracy of detecting the irradiating position of the reference light beam in the horizontal scanning direction, by arranging the photodiode 623 forming a third light receiving region, and the photodiode 624 forming a fourth light receiving region, in the horizontal scanning direction. For example, while the reference light beam scans the photodiode 623, for example, the photodiode 623 outputs a signal according to a light quantity of the reference light beam, for example. In addition, while the reference light beam scans the photodiode 624, for example, the photodiode 624 outputs a signal according to a light quantity of the reference light beam, for example.

Accordingly, the photodiode 620 in this embodiment may judge that the reference light beam is detected when the signal is no longer output from the photodiode 623 and the photodiode 624 starts to output the signal, and output a signal indicating that the reference light beam is detected.

According to the structure of the photodiode 620 described above, it is possible to detect when the reference light beam irradiates a boundary between the photodiode 623 and the photodiode 624 in the photodiode 620, to improve the accuracy of detecting the irradiating position of the reference light beam in the horizontal scanning direction.

Figure 6:
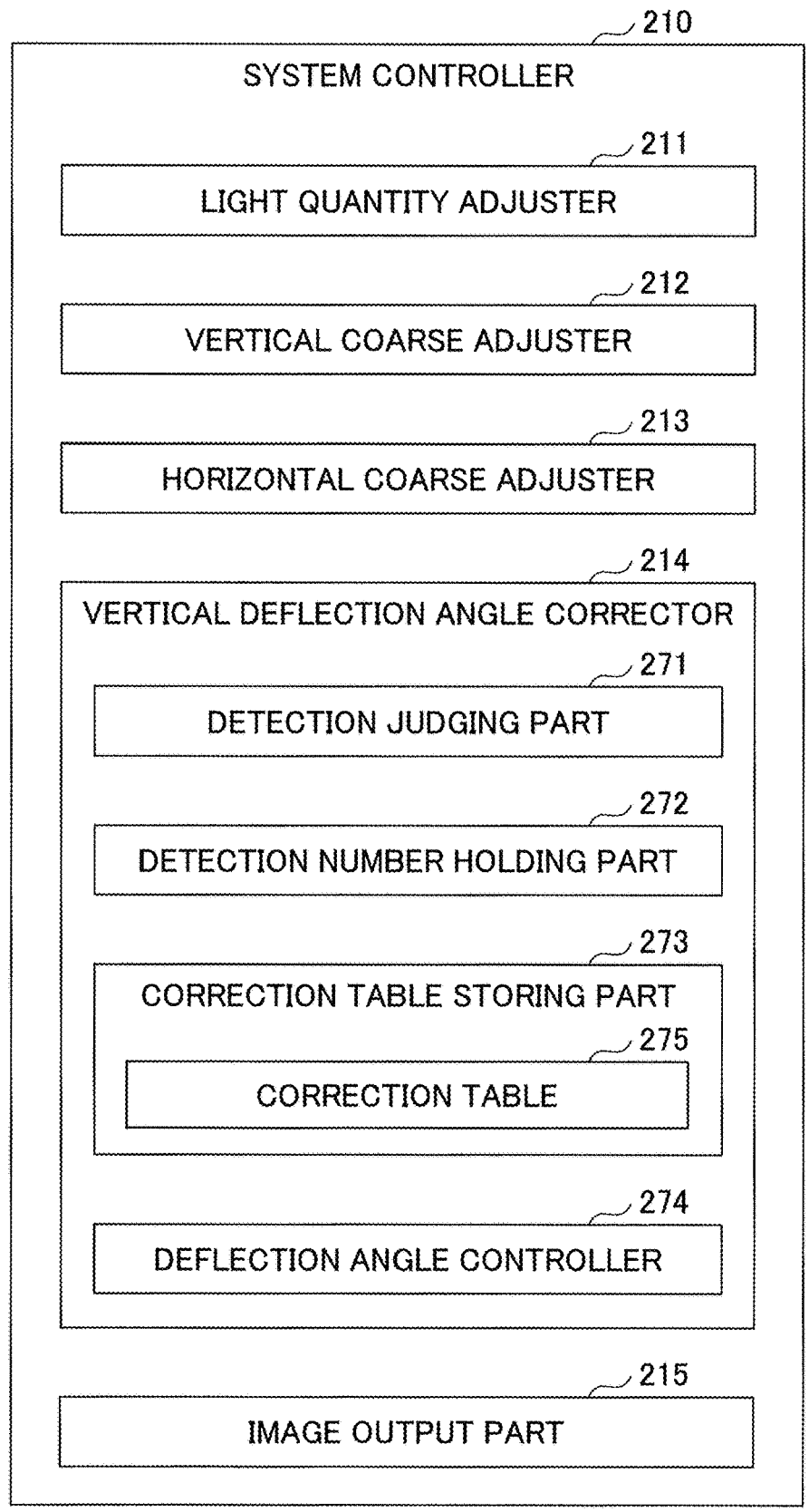
FIG. 6 is a diagram for explaining functions of a system controller in the first embodiment.

Next, functions of the system controller 210 in this embodiment will be described, by referring to FIG. 6. FIG. 6 is a diagram for explaining the functions of the system controller in the first embodiment.

The system controller 210 in this embodiment includes a light quantity adjuster 211, a vertical coarse adjuster 212, a horizontal coarse adjuster 213, a vertical deflection angle corrector 214, and an image output part 215.

The light quantity adjuster 211 adjusts light quantities of the light beams emitted from the laser diodes 120R, 120G, and 120B of the light source module 211.

The vertical coarse adjuster 212 performs a coarse adjustment of the deflection angle in the vertical scanning direction of the MEMS mirror 310. More particularly, the vertical coarse adjuster 212 acquires the detection signals output from the displacement sensors 352 and 353 of the optical scan module 130, via the buffer circuit 220. In addition, the vertical coarse adjuster 212 controls the mirror driving circuit 230 so that values indicated by the detection signals become closer to preset target values.

The horizontal coarse adjuster 213 performs a coarse adjustment of the deflection angle in the horizontal scanning direction of the MEMS mirror 310. More particularly, the horizontal coarse adjuster 213 acquires the detection signal output from the displacement sensors 351 of the optical scan module 130, via the buffer circuit 220. In addition, the horizontal coarse adjuster 213 controls the mirror driving circuit 230 so that a value indicated by the detection signal becomes closer to a preset target value.

The vertical detection angle corrector 214 corrects the deflection angle in the vertical scanning direction of the MEMS mirror 310, based on the number of times the photodiode 610 detects the reference light beam and the number of times the photodiode 620 detects the reference light beam in the optical sensor 600. Details of the vertical deflection angle corrector 214 will be described later.

The image output part 215 outputs image data input to the system controller 210, to the laser driving circuit 240, and projects the image data onto the screen 500.

The system controller 210 in this embodiment may be formed by a processor, such as a CPU (Central Processing Unit), and a storage device, such as a ROM (Read Only Memory), a RAM (Random Access Memory), or the like, for example. In other words, the functions of the system controller 210, including the light quantity adjuster 211, the vertical coarse adjuster 212, the horizontal coarse adjuster 213, the vertical deflection angle corrector 214, and the image output part 215 may be performed by the processor that executes a program stored in the storage device. Of course, a part of or all of the system controller 210, that is, a part of or all of the functions of the system controller 210, may be formed by hardware. In addition, the system controller 210 may be formed by a plurality of physically separate circuits.

Next, the vertical deflection angle corrector 214 will be described. The vertical deflection angle corrector 214 in this embodiment includes a detection judging part 271, a detection number holding part 272, a correction table storing part 273, and a deflection angle controller 274.

The detection judging part 271 judges whether each of the photodiode 610 and the photodiode 620 in the optical sensor 600 detected the reference light beam.

In this embodiment, the signal output from the photodiode 610 makes a transition from a high level to a low level when the photodiode 610 detects the reference light beam. In addition, in this embodiment, the signal output from the photodiode 620 makes a transition from a high level to a low level when the photodiode 620 detects the reference light beam.

Accordingly, the detection judging part 271 in this embodiment judges that the photodiode 610 detected the reference light beam when the signal output from the photodiode 610 makes the transition from the high level to the low level. In addition, the detection judging part 271 in this embodiment judges that the photodiode 620 detected the reference light beam when the signal output from the photodiode 620 makes the transition from the high level to the low level.

The detection number holding part 272 holds the number of times the detection judging part 271 detects that the reference light beam is detected by each of the photodiode 610 and the photodiode 620.

The correction table storing part 273 stores a correction table 275. The correction table 275 in this embodiment stores combinations of the number of times the photodiode 610 detects the reference light beam and the number of times the photodiode 620 detects the reference light beam, in correspondence with correction methods for correcting the deflection angle in the vertical scanning direction of the MEMS mirror 310. Details of the correction table 275 will be described later.

The deflection angle controller 274 determines the correction method for correcting the deflection angle, based on the number of times the detection judging part 271 detects that the reference light beam is detected by each of the photodiode 610 and the photodiode 620 and is held by the detection number holding part 272, and the correction table 275 stored in the correction table storing part 273. In addition, the deflection angle controller 274 corrects the deflection angle in the vertical scanning direction of the MEMS mirror 310 based on the determined correction method, by controlling the mirror driving circuit 230.

Next, the correction table 275 in this embodiment will be described, by referring to FIG. 7. FIG. 7 is a diagram illustrating an example of the correction table in the first embodiment.

The correction table 275 in this embodiment is supplied in advance to the system controller 210. In this embodiment, the correction table 275 stores information items including a "state", a "detection number of PD 620" indicating the number of times the photodiode 620 detects the reference light beam, a "detection number of PD 610" indicating the number of times the photodiode 610 detects the reference light beam, and the "correction method". In the correction table 275, the item "state", the item "detection number of PD 620", the item "detection number of PD 610", and the item "correction method" correspond to each other.

The item "state" has a value identifying a state of the deflection angle in the vertical scanning direction of the MEMS mirror 310.

The item "detection number of PD 620" has a value indicating a result of comparing the number of times the photodiode 620 detected the reference light beam and held in the detection number holding part 272, and a preset expected value of the number of times the reference light beam is detected by the photodiode 620. The item "detection number of PD 610" has a value indicating a result of comparing the number of times the photodiode 610 detected the reference light beam and held in the detection number holding part 272, and a preset expected value of the number of times the reference light beam is detected by the photodiode 610.

The item "correction method" indicates the correction method to be used to correct the deflection angle in the vertical scanning direction of the MEMS mirror 310, corresponding to a combination of the value of the item "detection number of PD 620" and the value of the item "detection number of PD 610".

In the correction table 275 illustrated in FIG. 7, the "state" 1 indicates a state in which the number of times the photodiode 620 detected the reference light beam and the number of times the photodiode 610 detected the reference light beam are the same as the respective expected values corresponding to the photodiodes 620 and 610. The deflection angle is not corrected in the "state" 1. In other words, the "correction method" for the "state" 1 is set to "no correction".

In the correction table 275, the "state" 2 indicates a state in which the number of times the photodiode 620 detected the reference light beam is the same as the expected value corresponding to the photodiode 620, and the number of times the photodiode 610 detected the reference light beam is greater than the expected value corresponding to the photodiode 610.

The "state" 2 indicates the state in which the deflection angle in the vertical scanning direction becomes small, the reference light beam incident to the overlapping regions 611 and 621 is no longer incident to the photodiode 620 (overlapping region 621) and only incident to the photodiode 610, and the photodiode 620 detects leakage light from the reference light beam.

Further, the "state" 2 indicates the state in which the deflection angle in the vertical scanning direction becomes small, the reference light beam is not incident to the overlapping regions 611 and 621, the reference light beam only incident to the photodiode 620 becomes incident to the photodiode 610, and the number of reference light beams incident to the photodiode 620 does not change. Hence, the "correction method" for the "state" 2 is set to "increase the deflection angle".

In the correction table 275, the "state" 3 indicates a state in which the number of times the photodiode 620 detects the reference light beam is the same as the expected value corresponding to the photodiode 620, and the number of times the photodiode 610 detects the reference light beam is smaller than the expected value corresponding to the photodiode 610. The "state" 3 indicates the state in which the deflection angle in the vertical scanning direction becomes large, the number of reference light beams incident to the photodiode 620 does not change, but the number of reference light beams incident to the photodiode 610 decreases. Hence, the "correction method" for the "state" 3 is set to "decrease the deflection angle".

In the correction table 275, the "state" 4 indicates a state in which the number of times the photodiode 620 detects the reference light beam is greater than the expected value corresponding to the photodiode 620, and the number of times the photodiode 610 detects the reference light beam is the same as the expected value corresponding to the photodiode 610.

The "state" 4 includes the state in which the deflection angle in the vertical scanning direction becomes large, the reference light beam incident to the photodiode 610 becomes incident outside the photodiode 610, but the photodiode 610 detects the leakage light of the reference light beam, and the number of times the photodiode 610 detects the reference light beam does not change. In addition, the "state" 4 includes the state in which the deflection angle in the vertical scanning direction becomes large, the reference light beam not incident to the photodiode 620 becomes incident to the photodiode 620, and the number of reference light beams incident to the photodiode 610 does not change. Hence, the "correction method" for the "state" 4 is set to "decrease the deflection angle".

In the correction table 275, the "state" 5 indicates a state in which the number of times the photodiode 620 detects the reference light beam and the number of times the photodiode 610 detects the reference light beam are both greater than the respective expected values of the corresponding photodiodes 620 and 610.

The "state" 5 may be regarded as a state in which the deflection angle in the vertical scanning direction becomes small, and an offset is generated in the display region 510. Hence, the "correction method" for the "state" 5 is set to "notify error".

In the correction table 275, the "state" 6 indicates a state in which the number of time the photodiode 620 detects the reference light beam is greater than the expected value corresponding to the photodiode 620, and the number of times the photodiode 610 detects the reference light beam is smaller than the expected value corresponding to the photodiode 610. The "state" 6 indicates the state in which the deflection angle in the vertical scanning direction becomes large, the number of reference light beams incident to one of the light receiving regions increases, and the number of reference light beams incident to the other of the light receiving regions decreases. In other words, the "state" 6 indicates the state in which the deflection angle simply changes. Hence, the "correction method" for the "state" 6 is set to "decrease the deflection angle".

In the correction table 275, the "state" 7 indicates a state in which the number of times the photodiode 620 detects the reference light beam is smaller than the expected value corresponding to the photodiode 620, and the number of times the photodiode 610 detects the reference light beam is the same as the expected value corresponding to the photodiode 610. The "state" 7 indicates the state in which the deflection angle in the vertical scanning direction becomes small, and the number of reference light beams incident to the photodiode 620 decreases. Hence, the "correction method" for the "state" 7 is set to "increase the deflection angle".

In the correction table 275, the "state" 8 indicates a state in which the number of times the photodiode 620 detects the reference light beam is smaller than the expected value corresponding to the photodiode 620, and the number of times the photodiode 610 detects the reference light beam is greater than the expected value corresponding to the photodiode 610. The "state" 8 indicates the state in which the deflection angle in the vertical scanning direction becomes large, the number of reference light beams incident to one of the light receiving regions increases, and the number of reference light beams incident to the other of the light receiving regions decreases. In other words, the "state" 8 indicates the state in which the deflection angle simply changes. Hence, the "correction method" for the "state" 8 is set to "increase the deflection angle".

In the correction table 275, the "state" 9 indicates a state in which the number of times the photodiode 620 detects the reference light beam and the number of times the photodiode 610 detects the reference light beam are smaller than the respective expected values corresponding to the photodiodes 620 and 610. The "state" 9 includes a case in which the reference light beam no longer becomes incident to both the photodiode 620 and the photodiode 610, or a case in which the number of reference light beams incident to one of the photodiode 620 and the photodiode 610 is smaller than the expected value corresponding to the one of the photodiodes 620 and 610. In other words, the "state" 9 may be regarded as a state in which the deflection angle is greatly increased, or the deflection angle is greatly decreased. Hence, the "correction method" for the "state" 9 is set to "return to coarse adjustment".

Figure 8:
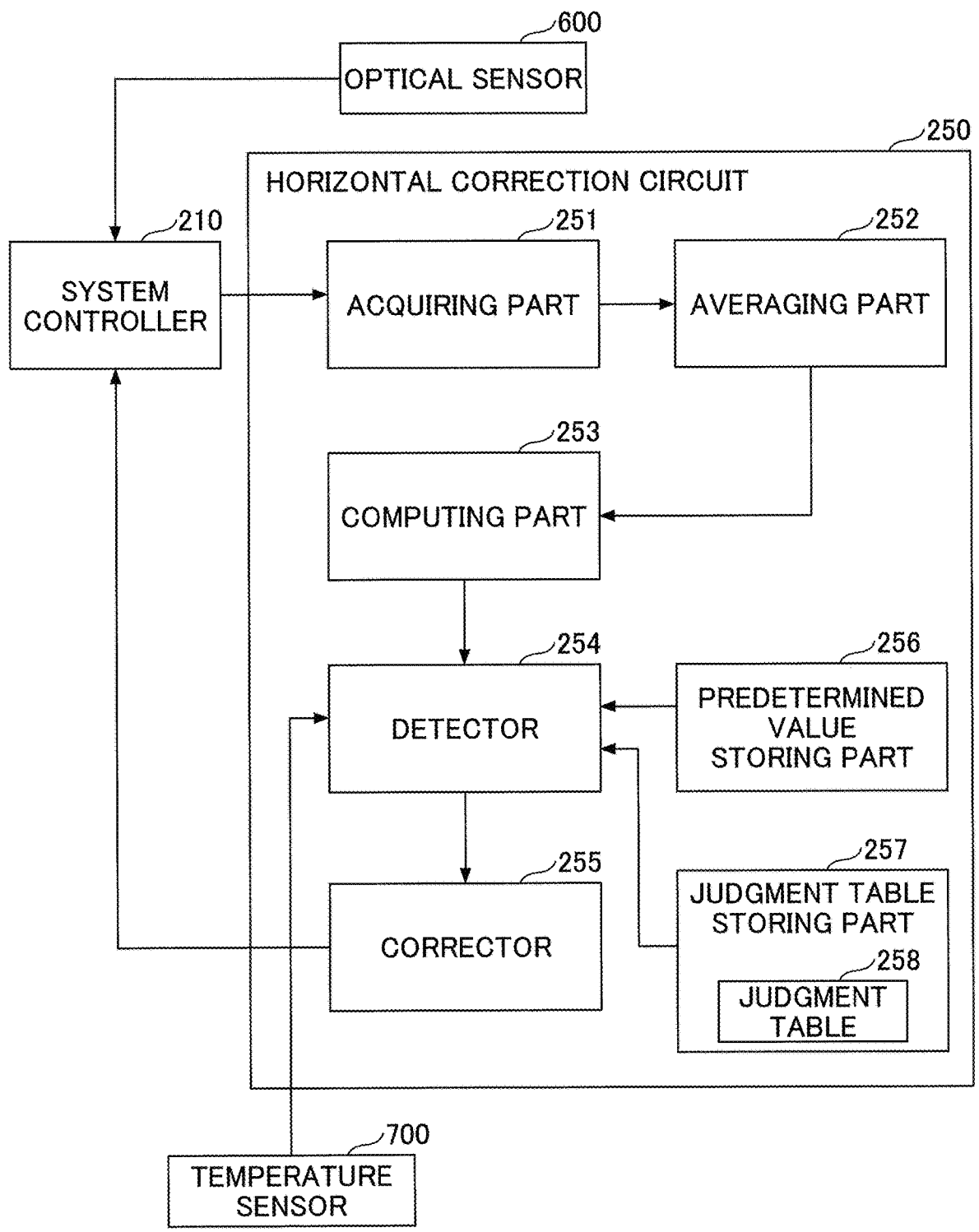
FIG. 8 is a diagram for explaining functions of a horizontal correction circuit in the first embodiment.

Next, the horizontal correction circuit 250 in this embodiment will be described, by referring to FIG. 8. FIG. 8 is a diagram for explaining functions of the horizontal correction circuit in the first embodiment.

In this embodiment, the horizontal correction circuit 250 identifies a pixel detected by the optical sensor 600 in the forward path of the horizontal scan of the reference light beam, and identifies a pixel detected by the optical sensor 600 in the backward path of the horizontal scan of the reference light beam. In the following description, the pixel detected in the forward path is referred to as a first pixel, and the pixel detected in the backward path is referred to as a second pixel.

In addition, the horizontal correction circuit 250 in this embodiment detects and corrects each of the phase error in the horizontal scanning direction of the laser beam and the change in the deflection angle of the MEMS mirror 310, based on an error of the first pixel from a predetermined value, and an error of the second pixel from a predetermined value.

The horizontal correction circuit 250 in this embodiment includes an acquiring part 251, an averaging part 252, a computing part 253, a detector 254, a corrector 255, a predetermined value storing part 256, and a judgment table storing part 257.

The acquiring part 251 acquires the detection result of the optical sensor 600. More particularly, the acquiring part 251 acquires a first pixel count value of the first pixel and a second pixel count value of the second pixel, from the system controller 210, as the detection result of the optical sensor 600.

In other words, the system controller 210 functions as an identifying part that identifies each of the pixels irradiated on the screen 500, from the laser beam detected by the optical sensor 600. For example, the identifying part identifies a position of each pixel among the pixels, that is, in the ordered arrangement of the pixels on the screen 500.

The identifying part may be included in the horizontal correction circuit 250. In addition, in a case in which the optical sensor 600 is capable of detecting a plurality of pixels successively arranged along the horizontal direction, the system controller 210 may identify the pixel that is first detected by the optical sensor 600 as being the first pixel or the second pixel.

In this embodiment, the acquiring part 251 repeatedly acquires the first pixel count value and the second pixel count value. In other words, the acquiring part 251 acquires the first pixel count value and the second pixel count value a predetermined number of times. For example, in the region where the optical sensor 600 is provided, other than the display region, the reference light beam performs the horizontal scan for every one frame. For this reason, the optical sensor 600 detects the first pixel and the second pixel for every one frame, and acquires the first pixel count value and the second pixel count value for every one frame.

The averaging part 252 computes an average value of a predetermined number of first pixel count values acquired by the acquiring part 251, and computes an average value of a predetermined number of second pixel count values acquired by the acquiring part 251.

The computing part 253 computes a sum of the first pixel count value and the second pixel count value, and a difference between the first pixel count value and the second pixel count value, respectively. More particularly, because the averaging part 252 performs an averaging process in this embodiment, the computing part 253 computes a sum of the average value of the first pixel count value and the average value of the second pixel count value, and a difference between the average value of the first pixel count value and the average value of the second pixel count value, respectively.

The detector 254 detects a phase error in the horizontal scanning direction of the laser beam, and a change in the deflection angle of the MEMS mirror 310, according to the error of the first pixel from the predetermined value, and the error of the second pixel from the predetermined value. More particularly, because the averaging part 252 performs an averaging process in this embodiment, the detector 254 detects whether the phase error is generated in the horizontal scanning direction of the laser beam, and whether the change is generated in the deflection angle of the MEMS mirror 310, according to the error of the sum computed by the computing part 253 from the predetermined value, and the error of the difference computed by the computing part 253 from the predetermined value.

In a case in which the detector 254 detects that the phase error in the horizontal scanning direction of the laser beam is generated, the corrector 255 corrects the phase error according to the amount of the phase error, that is, according to the amount of error of the pixel from the predetermined value.

For example, the corrector 255 receives an irradiation start timing of the laser beam from the system controller 210, and modifies the irradiation start timing according to the amount of the phase error, to return the modified irradiation start timing to the system controller 210. Alternatively, the corrector 255 may instruct the system controller 210 to modify the irradiation start timing of the laser beam according to the amount of the phase error. Hence, an emission start timing of the laser beam emitted from the LD module 120 is modified, to correct the phase error in the horizontal scanning direction of the laser beam.

In addition, when the detector 254 detects that the change is generated in the deflection angle of the MEMS mirror 310, the corrector 255 corrects the change in the deflection angle, according to the amount of the change in the deflection angle, that is, according to the amount of error of the pixel from the predetermined value. For example, the corrector 255 receives a horizontal deflection angle gain of the MEMS mirror 310 from the system controller 210, and modifies the horizontal deflection angle gain according to the amount of change in the deflection angle, to return the modified horizontal deflection angle gain to the system controller 210. Alternatively, the corrector 255 may instruct the system controller 210 to modify the horizontal deflection angle gain of the MEMS mirror 310 according to the amount of change in the deflection angle. Hence, the deflection angle of the MEMS mirror 310 is modified, to correct the change in the deflection angle of the MEMS mirror 310.

The predetermined value storing part 256 stores the predetermined value of the pixel count value of the first pixel to be detected by the optical sensor 600 in the forward path of the horizontal scan, and the predetermined value of the pixel count value of the second pixel to be detected by the optical sensor 600 in the backward path of the horizontal scan.

More particularly, the predetermined value storing part 256 stores the predetermined value of the sum of the first pixel count value and the second pixel count value, and the predetermined value of the difference between the first pixel count value and the second pixel count value. These predetermined values are set to values based on the pixel count value to be detected by the optical sensor 600 when neither the phase error in the horizontal scanning direction of the laser beam nor the change in the deflection angle of the MEMS mirror 310 are generated.

The predetermined value storing part 256 may store the predetermined values (or corrected values of the predetermined values), for every temperature detected by the temperature sensor 700. In this case, the detector 254 may use the predetermined values corresponding to the temperature detected by the temperature sensor 700, to detect whether the phase error in the horizontal scanning direction of the laser beam is generated, and to detect whether the change in the deflection angle of the MEMS mirror 310 is generated, respectively. In this case, changes in output timings of pulses from the optical sensor 600, caused by the effects of temperature, can be canceled by the predetermined values.

The judgment table storing part 257 stores a judgment table 258. The judgment table 258 is used to judge, based on the first pixel count value and the second pixel count value, whether the phase error in the horizontal scanning direction of the laser beam is generated, and whether the change in the deflection angle in the horizontal scanning direction of the MEMS mirror 310 is generated, respectively. Details of the judgment table 258 will be described later.

In this embodiment, in a case in which the irradiation start timing of the laser beam is settable for each of the forward path and the backward path of the horizontal scan, the corrector 255 may correct the irradiation start timing of the laser beam for each of the forward path and the backward path of the horizontal scan, according to the amount of the phase error in the horizontal scanning direction of the laser beam.

The horizontal correction circuit 250 in this embodiment includes constituent elements such as a CPU (Central Processing Unit), a ROM (Read Only Memory), a RAM (Random Access Memory), or the like, for example. The CPU is an example of a processor. In other words, the functions of the horizontal correction circuit 250 may be performed by the constituent elements of the horizontal correction circuit 250. For example, the functions of the predetermined value storing part 256 and the judgment table storing part 257 may be performed using the ROM or the like included in the horizontal correction circuit 250. In addition, the functions of the acquiring part 251, the averaging part 252, the computing part 253, the detector 254, and the corrector 255 may be performed by the CPU that executes a program stored in the ROM or the like of the horizontal correction circuit 250. The program may be provided together with the horizontal correction circuit 250, in a state in which the program is preinstalled in the horizontal correction circuit 250. Alternatively, the program may be provided separately from outside the horizontal correction circuit 250, and provided to the horizontal correction circuit 250, or the program may be provided separately from outside the horizontal correction circuit 250, and installed in the horizontal correction circuit 250. In the latter case, the program may be provided by an external storage medium, such as a USB (Universal Serial Bus) memory, a memory card, a CD-ROM (Compact Disk-Read Only Memory), or the like, or the program may be downloaded from a server via a network, such as the Internet or the like, for example. A part of or all of the horizontal correction circuit 250, that is, a part of or all of the functions of the horizontal correction circuit 250, may be formed by hardware. In addition, the horizontal correction circuit 250 may be formed by a plurality of physically separate circuits.

Next, the judgment table 258 in this embodiment will be described, by referring to FIG. 9. FIG. 9 is a diagram illustrating an example of the judgment table in the first embodiment.

The judgment table 258 in this embodiment stores information items, including conditions and judgment values. In the judgment table 258, the conditions and the judgment values are stored in correspondence with each other. In addition, in the judgment table 258, the item "condition" includes an item "sum" and an item "difference", and the item "judgment value" includes an item "change in deflection angle" and an item "phase error".

In the judgment table 258, the item "sum" indicates whether the sum of the first pixel count value and the second pixel count value is deviated from the predetermined value. For example, in a case in which the item "sum" is indicated by a symbol "o", the sum of the first pixel count value and the second pixel count value is not deviated from the predetermined value. In a case in which the item "sum" is indicated by a symbol "x", the sum of the first pixel count value and the second pixel count value is deviated from the predetermined value.

In the judgment table 258, the item "difference" indicates whether the difference between the first pixel count value and the second pixel count value is deviated from the predetermined value. For example, in a case in which the item "difference" is indicated by a symbol "o", the difference between the first pixel count value and the second pixel count value is not deviated from the predetermined value. In a case in which the item "difference" is indicated by a symbol "x", the difference between the first pixel count value and the second pixel count value is deviated from the predetermined value.

In the judgment table 258, the item "change in deflection angle" indicates whether the change in the deflection angle of the MEMS mirror 310 is generated. For example, in a case in which the item "change in deflection angle" is indicated as "yes", the change in the deflection angle is generated. In a case in which the item "change in deflection angle" is indicated as "no", the change in the deflection angle is not generated.

In the judgment table 258, the item "phase error" indicates whether the phase error in the horizontal scanning direction of the laser beam is generated. For example, in a case in which the item "phase error" is indicated as "yes", the phase error in the horizontal scanning direction of the laser beam is generated. In a case in which the item "phase error" is indicated as "no", the phase error in the horizontal scanning direction of the laser beam is not generated.

In the example illustrated in FIG. 9, when both the item "sum" and the item "difference" are indicated by the symbol "o", "no" is set for each of the item "change in deflection angle" and the item "phase error". In addition, in the example illustrated in FIG. 9, when the item "sum" is indicated by the symbol "o" and the item "difference" is indicated by the symbol "x", "no" is set to the item "change in deflection angle" and "yes" is set in the item "phase error". In the example illustrated in FIG. 9, when the item "sum" is indicated by the symbol "x" and the item "difference" is indicated by the symbol "o", "yes" is set in the item "change in deflection angle" and "no" is set in the item "phase error". Further, in the example illustrated in FIG. 9, when both the item "sum" and the item "difference" are indicated by the symbol "x", "yes" is set for each of the item "change in deflection angle" and the item "phase error".

A reference is made to the judgment table 258 in this embodiment when the detector 254 detects whether the change in the deflection angle and the phase error are generated. By referring to the judgment table 258, the detector 254 can easily judge whether the change in the deflection angle of the MEMS mirror 310 is generated and whether the phase error in the horizontal scanning direction of the laser beam is generated, from the sum of the pixel count value in the forward path and the pixel count value in the backward path, and the difference between the pixel count value in the forward path and the pixel count value in the backward path.

Next, a description will be given of the correction of the deflection angle in the vertical scanning direction of the image projection apparatus 100 in this embodiment, and the correction of the deflection angle in the horizontal scanning direction and the phase error of the image projection apparatus 100 in the embodiment.

Figure 10:
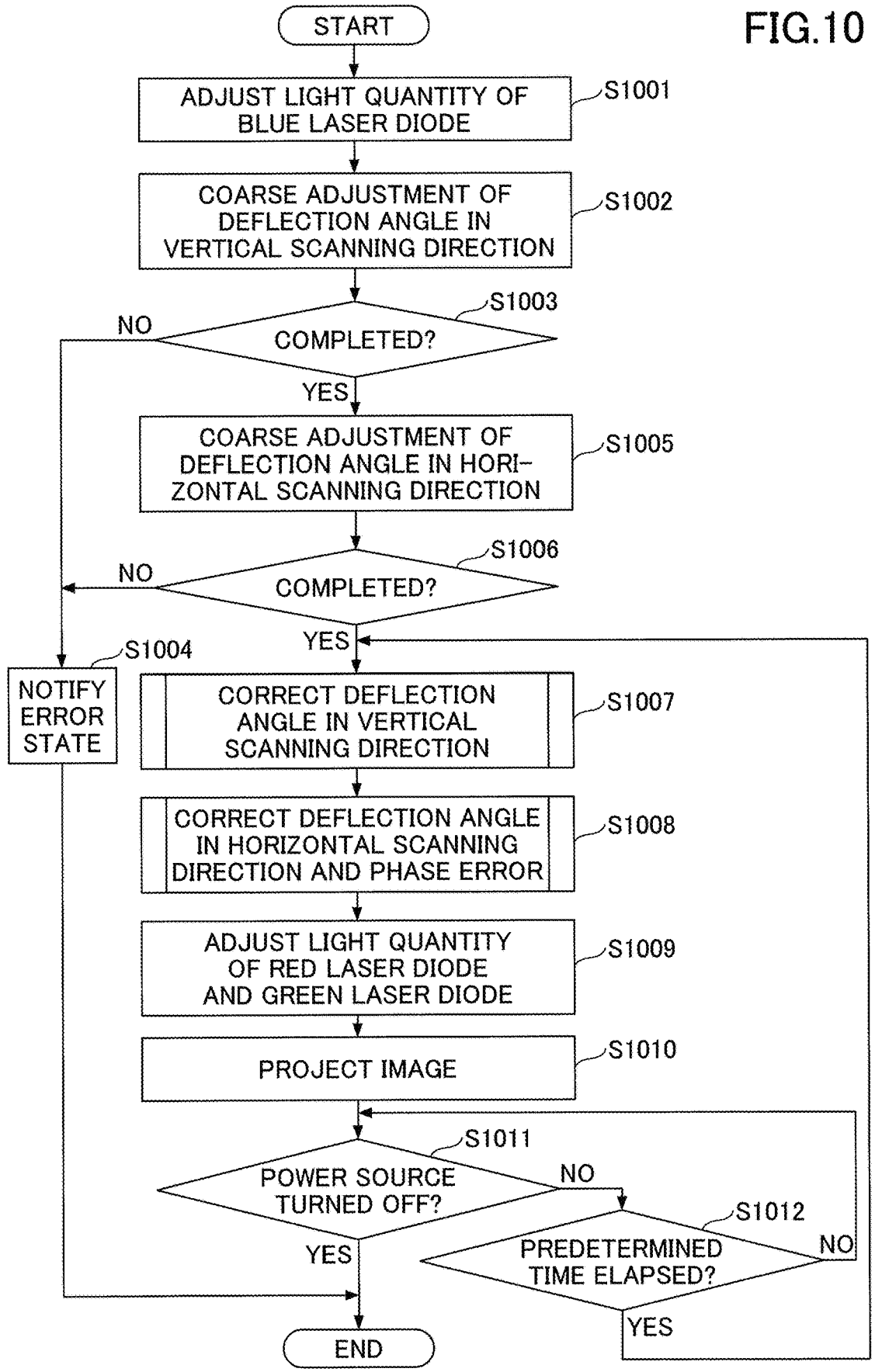
FIG. 10 is a flow chart for explaining a correction process of the image projection apparatus in the first embodiment.

FIG. 10 is a flow chart for explaining a correction process of the image projection apparatus in the first embodiment.

When the image projection apparatus 100 in this embodiment is started by turning on a power source, for example, the light quantity adjuster 211 of the system controller 210 adjusts the light quantity of the reference light beam irradiated from the laser diode 120B to the predetermined light quantity (step S1001). More particularly, the system controller 210 instructs the laser driving circuit 240 to cause the laser diode 120B to irradiate the reference light beam having the predetermined light quantity.

Next, the in the image projection apparatus 100, the vertical coarse adjuster 212 of the system controller 210 performs the coarse adjustment of the deflection angle in the vertical scanning direction (step S1002). Then, the system controller 210 judges whether the coarse adjustment in the vertical scanning direction is completed (step S1003).

More particularly, the system controller 210 performs a control so that the values indicated by the detection signals from the displacement sensors 352 and 353 become closer to the preset target values. In addition, the system controller 210 judges that the coarse adjustment is completed when the optical sensor 600 detects the reference light beam during a predetermined time of the control.

When the coarse adjustment is not completed and the judgment result in step S1003 is NO, the system controller 210 notifies an error state of the image projection apparatus 100 (step S1004), and the process of the image projection apparatus 100 ends.

On the other hand, when the coarse adjustment is completed and the judgment result in step S1003 is YES, the horizontal coarse adjuster 213 of the system controller 210 in the image projection apparatus 100 performs the coarse adjustment in the horizontal scanning direction (step S1005). Next, the system controller 210 judges whether the coarse adjustment in the horizontal scanning direction is completed (step S1006).

The judgment performed in step S1006 may be similar to the judgment performed in step S1003. When the coarse adjustment is not completed and the judgment result in step S1006 is NO, the process of the image projection apparatus 100 advances to step S1004.

On the other hand, when the coarse adjustment is completed and the judgment result in step S1006 is YES, the vertical deflection angle corrector 214 of the system controller 210 in the image projection apparatus 100 corrects the deflection angle in the vertical scanning direction of the MEMS mirror 310 (step S1007). Details of the process performed in step S1007 will be described later.

Next, the horizontal correction circuit 250 of the image projection apparatus 100 corrects the deflection angle in the horizontal scanning direction of the MEMS mirror 310 and the phase error (step S1008). Details of the process performed in step S1008 will be described later.

Next, the light quantity adjuster 211 of the image projection apparatus 100 adjusts the light quantities of the reference light beams irradiated from the laser diodes 120R and 120G to the predetermined light quantities (step S1009).

Next, the image output part 215 of the system controller 210 of the system controller 210 of the image projection apparatus 100 projects the image on the screen 500 based on the input image data (step S1010).

Next, the image projection apparatus 100 judges whether the power source is turned off (step S1011). When the power source is turned off and the judgment result in step S1011 is YES, the process of the image projection apparatus 100 ends.

When the power source is not turned off and the judgment result in step S1011 is NO, the system controller 210 judges whether a predetermined time has elapsed (step S1012). When the predetermined time has not elapsed and the judgment result in step S1012 is NO, the process of the image projection apparatus 100 turns to step S1011.

When the predetermined time has elapsed and the judgment result in step S1012 is YES, the process of the image projection apparatus 100 returns to step S1007.

Accordingly, in this embodiment, the deflection angle in the horizontal scanning direction and the phase error are corrected, after correcting the deflection angle in the vertical scanning direction.

Hence, in this embodiment, the horizontal correction circuit 250 can perform the correction in the horizontal scanning direction, in the state in which the reference light beam is detected by the photodiode 620.

In addition, in this embodiment, the deflection angle in the vertical scanning direction is corrected, after performing the coarse adjustment in each of the vertical scanning direction and the horizontal scanning direction. For this reason, in this embodiment, the vertical deflection angle corrector 214 can correct the deflection angle in the vertical scanning direction, in the state in which the reference light beam is irradiated on the MEMS mirror 310.

Figure 11:
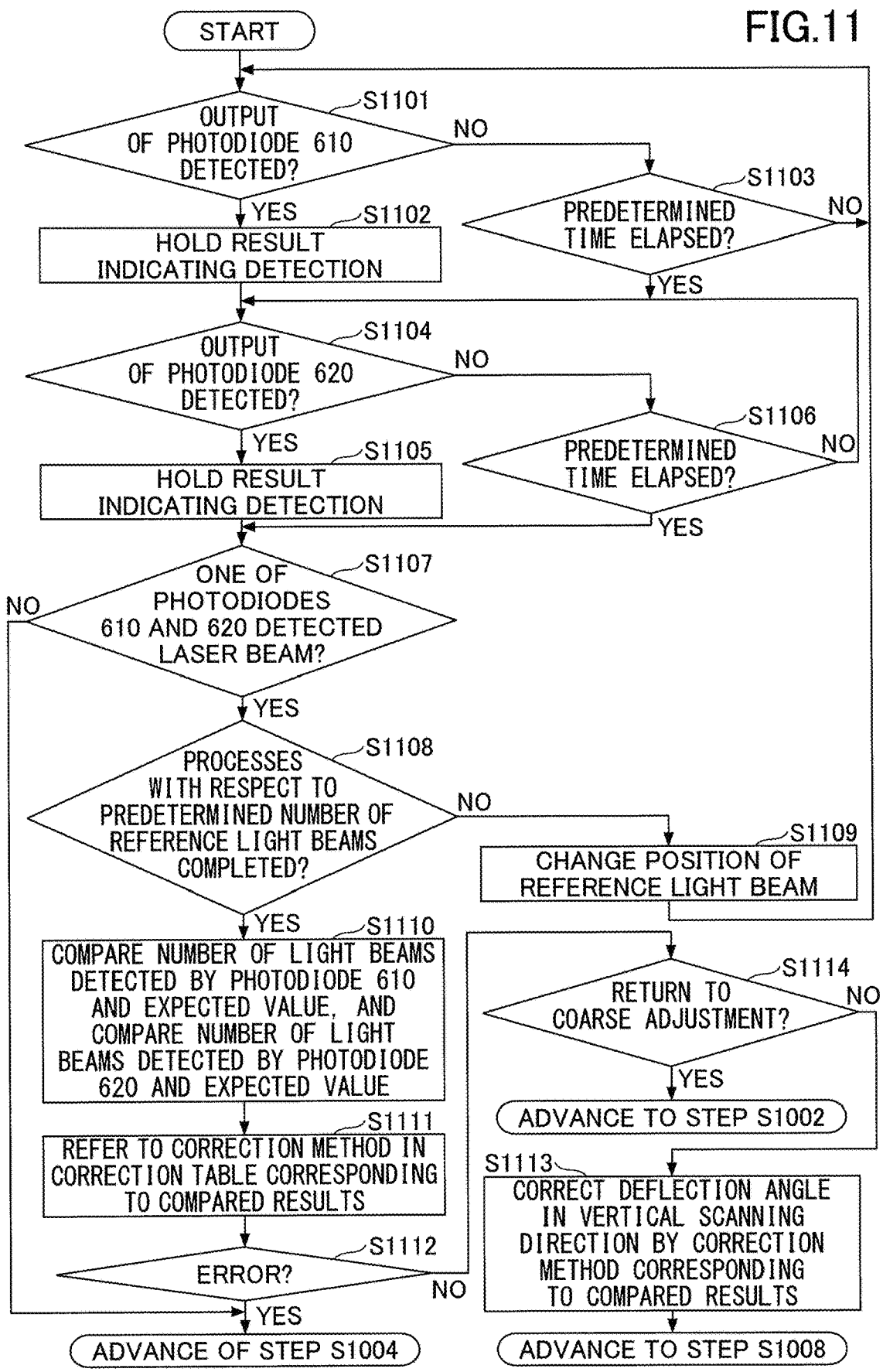
FIG. 11 is a flow chart for explaining a process of a vertical deflection angle corrector in the first embodiment.

Next, the process of the vertical deflection angle corrector 214 in this embodiment will be described, by referring to FIG. 11. FIG. 11 is a flow chart for explaining a process of the vertical deflection angle corrector in the first embodiment. FIG. 11 illustrates the process of step S1007 illustrated in FIG. 10 in more detail.

The vertical deflection angle corrector 214 in this embodiment judges whether the signal output from the photodiode 610 is detected by the detection judging part 271 (step S1101). In other words, the detection judging part 271 judges whether the reference light beam scanned the photodiode 610.

When the signal output from the photodiode 610 is detected and the judgment result in step S1101 is YES, the vertical detection angle corrector 214 holds, by the detection number holding part 272, information indicating that the reference light beam is detected by the photodiode 610 (step S1102), and the process advances to step S1104 which will be described later. In other words, the detection number holding part 272 increments, by one, the number of times the reference light beam is detected by the photodiode 610.

When the signal output from the photodiode 610 is not detected and the judgment result in step S1101 is NO, the vertical deflection angle corrector 214 judges whether a predetermined time has elapsed from a time when the reference light beam is irradiated (step S1103). When the predetermined time has not elapsed from the time when the reference light beam is irradiated and the judgment result in step S1103 is NO, the vertical deflection angle corrector 214 returns the process to step S1101.

When the predetermined time has elapsed from the time when the reference light beam is irradiated and the judgment result in step S1103 is YES, the vertical deflection angle corrector 214 judges whether the signal output from the photodiode 620 is detected by the detection judging part 271 (step S1104). In other words, the detection judging part 271 judges whether the reference light beam scanned the photodiode 620.

When the signal output from the photodiode 620 is detected and the judgment result in step S1104 is YES, the vertical deflection angle corrector 214 holds, by the detection number holding part 272, information indicating that the reference light beam is detected by the photodiode 620 (step S1105), and the process advances to step S1106 which will be described later. In other words, the detection number holding part 272 increments, by one, the number of times the reference light beam is detected by the photodiode 620.

When the signal output from the photodiode 620 is not detected and the judgment result in step S1104 is NO, the vertical deflection angle corrector 214 judges whether a predetermined time has elapsed from a time when the reference light beam is irradiated (step S1106). When the predetermined time has not elapsed from the time when the reference light beam is irradiated and the judgment result in step S1106 is NO, the vertical deflection angle corrector 214 returns the process to step S1104.

When the predetermined time has elapsed from the time when the reference light beam is irradiated and the judgment result in step S1106 is YES, the vertical deflection angle corrector 214 judges whether the signal output from at least one of the photodiodes 610 and 620 is detected by the detection judging part 271 (step S1107). In other words, the detection judging part 271 judges whether at least one of the number of times the reference light beam is detected by the photodiode 610, and the number of times the reference light beam is detected by the photodiode 620, held by the detection number holding part 272, increased.

When both the photodiode 610 and the photodiode 620 do not detect the reference light beam and the judgment result in step S1107 is NO, the process of the image projection apparatus 100 advances to step S1004 illustrated in FIG. 10.

When at least one of the photodiode 610 and the photodiode 620 detects the reference light beam and the judgment result in step S1107 is YES, the vertical deflection angle corrector 214 judges whether the processes of steps S1101 through S1106 with respect to a predetermined number of reference light beams are completed (step S1108). When the irradiation of the predetermined number of reference light beams is not completed and the judgment result in step S1108 is NO, the vertical deflection angle corrector 214 changes the irradiation position of the reference light beam (step S1109), and the process returns to step S1101.

In this embodiment, the number of reference light beams used to correct the deflection angle in the vertical scanning direction by the vertical deflection angle corrector 214 may be set in advance.

When the processes with respect to the predetermined number of reference light beams are completed and the judgment result in step S1108 is YES, the deflection angle controller 274 compares both the number of times the reference light beam is detected by the photodiode 610, and the number of times the reference light beam is detected by the photodiode 620, that are held by the detection number holding part 272, with the respective expected values corresponding to the photodiodes 610 and 620 (step S1110).

In this embodiment, the expected value of the number of times the reference light beam is detected by the photodiode 610, and the expected value of the number of times reference light beam is detected by the photodiode 620, may be preset in the deflection angle controller 274.

Next, the vertical deflection angle corrector 214 makes a reference to the correction table 275 by the deflection angle controller 274, to refer to the correction method that corresponds to the relationship of the number of times the reference light beam is detected by the photodiode 610 and the expected value corresponding to the photodiode 610, and the relationship of the number of times the reference light beam is detected by the photodiode 620 and the expected value corresponding to the photodiode 620 (step S1111).

More particularly, the deflection angle controller 274 identifies the state in the correction table 275, based on a compared result of the number of times the reference light beam is detected by the photodiode 610 and the expected value corresponding to the photodiode 610, and a compared result of the number of times the reference light beam is detected by the photodiode 620 and the expected value corresponding to the photodiode 610. In addition, the deflection angle controller 274 refers to the correction method corresponding to the identified state in the correction table 275.

Next, the vertical deflection angle corrector 214 judges whether the referred correction method is an error notification (step S1112). When the referred correction method is the error notification and the judgment result in step S1112 is YES, the process of the image projection apparatus 100 advances to step S1004 illustrated in FIG. 10.

On the other hand, when the referred correction method is not the error notification and the judgment result in step S1112 is NO, the vertical deflection angle corrector 214 judges whether the correction method is "return to coarse adjustment" (step S1114). When the correction method is "return to coarse adjustment" and the judgment result in step S1114 is YES, the process of the image projection apparatus 100 advances to step S1002 illustrated in FIG. 10.

When the correction method is not "return to coarse adjustment" and the judgment result in step S1114 is NO, the deflection angle controller 274 corrects the deflection angle in the vertical scanning direction of the MEMS mirror 310, based on the referred correction method (step S1113), and the process of the image projection apparatus 100 advances to step S1008 illustrated in FIG. 10.

More particularly, the deflection angle corrector 274 instructs the mirror driving circuit 230 to increase the deflection angle in the vertical scanning direction of the MEMS mirror 310, to decrease the deflection angle in the vertical scanning direction of the MEMS mirror 310, or the like.

Figure 12:
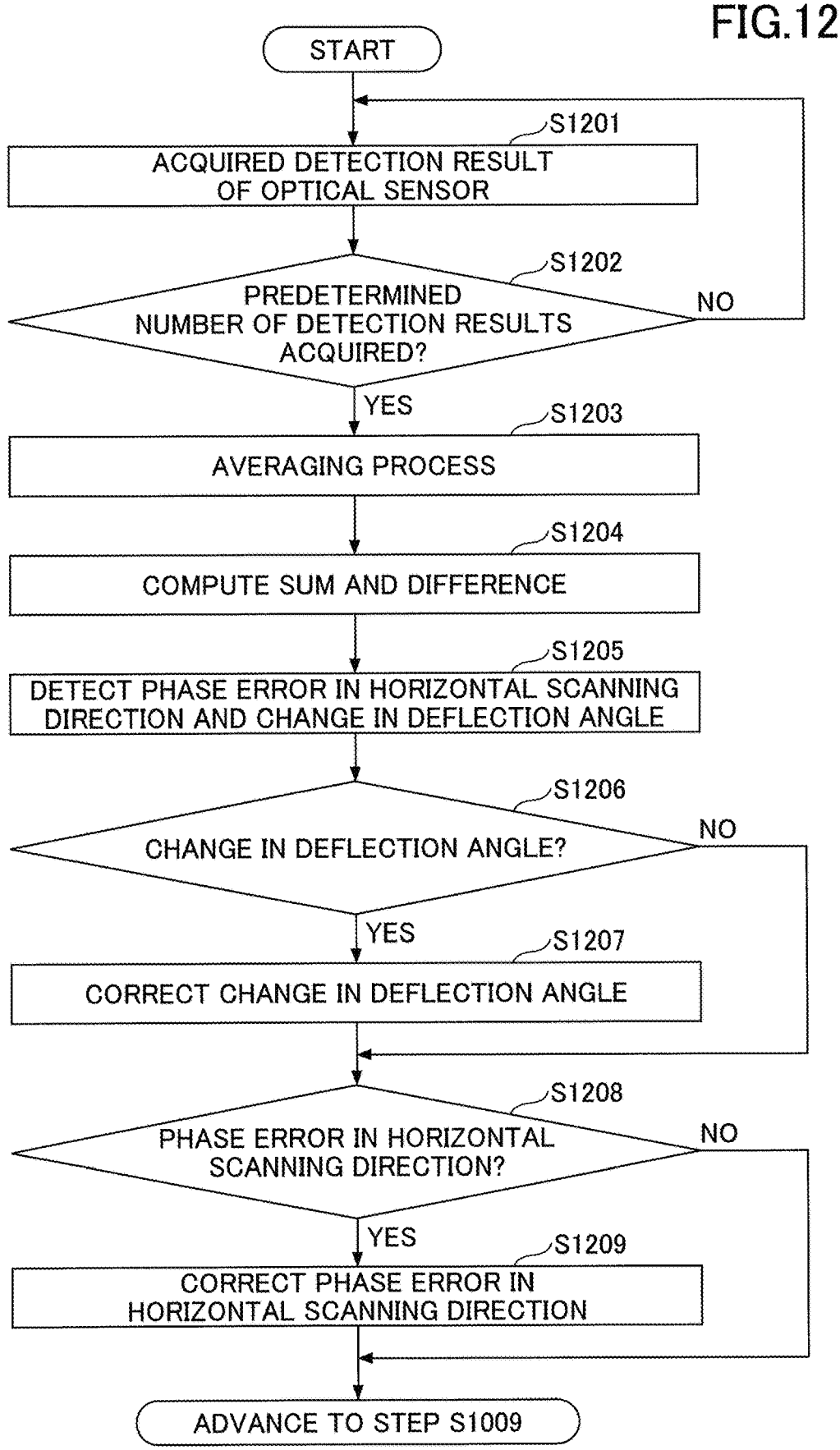
FIG. 12 is a flow chart for explaining a process of the horizontal correction circuit in the first embodiment.

Next, the correction by the horizontal correction circuit 250 in this embodiment will be described, by referring to FIG. 12. FIG. 12 is a flow chart for explaining the process of the horizontal correction circuit in the first embodiment. FIG. 12 illustrates the process of step S1008 illustrated in FIG. 10 in more detail.

The horizontal correction circuit 250 of the image projection apparatus 100 in this embodiment acquires the detection result of the optical sensor 600 from the system controller 210 by the acquiring part 251 (step S1201).

The detection result of the optical sensor 600 includes the first pixel count value acquired in the forward path of the horizontal scan by the irradiated reference light beam, and the second pixel count value acquired in the backward path of the horizontal scan by the irradiated reference light beam, after the deflection angle in the vertical scanning direction is corrected by the vertical deflection angle corrector 214. Accordingly, the reference light beams irradiated by the image projection apparatus 100 in this embodiment include the predetermined number of reference light beams for correcting the deflection angle in the vertical scanning direction of the MEMS mirror 310, and the predetermined number of reference light beams for correcting the deflection angle in the horizontal scanning direction of the MEMS mirror 310 and the phase error.

Next, the horizontal correction circuit 250 judges, by the averaging part 252, whether a predetermined number of detection results of the optical sensor 600 is acquired by the acquiring part 251 (step S1202). When the predetermined number of detection results of the optical sensor 600 is not acquired and the judgment result in step S1202 is NO, the process of the horizontal correction circuit 250 returns to step S1201.

On the other hand, when the predetermined number of detection results of the optical sensor 600 is acquired and the judgment result in step S1202 is YES, the averaging part 252 performs the averaging process (step S1203). More particularly, the averaging part 252 computes each of an average value of a predetermined number of first pixel count values, and an average value of a predetermined number of second pixel count values. In addition, the computing part 253 computes the sum and the difference of the average value of the first pixel count values, and the average value of the second pixel count values (step S1204).

Next, the horizontal correction circuit 250 detects, by the detector 254, each of the phase error in the horizontal scanning direction of the laser beam, and the change in the deflection angle of the MEMS mirror 310, based on the sum and the difference computed in step S1204, the predetermined values stored in the predetermined value storing part 256, and the judgment table 258 (step S1205).

Next, the horizontal correction circuit 250 judges, by the corrector 255, whether the change in the deflection angle of the MEMS mirror 310 is detected (step S1206).

When the change in the deflection angle of the MEMS mirror 310 is not detected and the judgment result in step S1206 is NO, the process of the horizontal correction circuit 250 advances to step S1208 which will be described later.

On the other hand, when the change in the deflection angle of the MEMS mirror 310 is detected and the judgment result in step S1206 is YES, the corrector 255 corrects the change in the deflection angle of the MEMS mirror 310 (step S1207), and the process of the horizontal correction circuit 250 advances to step S1208.

The horizontal correction circuit 250 judges, by the corrector 255, whether the phase error in the horizontal scanning direction of the laser beam is detected (step S1208).

When the phase error in the horizontal scanning direction of the laser beam is not detected and the judgment result in step S1208 is NO, the process of the image projection apparatus 100 advances to step S1009 illustrated in FIG. 10.

On the other hand, when the phase error in the horizontal scanning direction of the laser beam is detected and the judgment result in step S1208 is YES, the horizontal correction circuit 250 corrects, by the corrector 255, the phase error in the horizontal scanning direction of the laser beam (step S1209), and the process of the image projection apparatus 100 advances to step S1009 illustrated in FIG. 10.

Next, a more detailed description will be given of the correction performed by the horizontal correction circuit 250, by referring to FIG. 13 through FIG. 16.

FIG. 13 is a diagram illustrating a first example of the correction method performed by the horizontal correction circuit.

FIG. 13 illustrates an example of a case in which neither the change in the deflection angle nor the phase error is generated. In this example, the first pixel count value is "504", and the second pixel count value is "504". In this case, the computing part 253 computes the sum of the first and second pixel count values, which is "1008". In addition, the computing part 253 computes the difference of the first and second pixel count values, which is "0". In other words, the sum and the difference computed by the computing part 253 are the same as the predetermined values stored in the predetermined value storing part 256. In this case, the detector 254 judges, based on the judgment table 258, that neither the change in the deflection angle nor the phase error is generated. Hence, no correction is performed by the corrector 255.

FIG. 14 is a diagram illustrating a second example of the correction method performed by the horizontal correction circuit.

FIG. 14 illustrates an example of a case in which only a phase error amounting to one pixel is generated. In this example, the first pixel count value is "503", and the second pixel count value is "505". In this case, the computing part 253 computes the sum of the first and second pixel count values, which is "1008". In addition, the computing part 253 computes the difference of the first and second pixel count values, which is "−2". In other words, the sum computed by the computing part 253 is the same as the predetermined value stored in the predetermined value storing part 256, but the difference computed by the computing part 253 is different from the predetermined value stored in the predetermined value storing part 256. In this case, the detector 254 judges, based on the judgment table 258, that no change in the deflection angle is generated, but the phase error is generated. Hence, the corrector 255 performs only the correction of the phase error amounting to one pixel.

FIG. 15 is a diagram illustrating a third example of the correction method performed by the horizontal correction circuit.

FIG. 15 illustrates an example of a case in which only a change in the deflection angle amounting to one pixel is generated. In this example, the first pixel count value is "503", and the second pixel count value is "503". In this case, the computing part 253 computes the sum of the first and second pixel count values, which is "1006". In addition, the computing part 253 computes the difference of the first and second pixel count values, which is "0". In other words, the sum computed by the computing part 253 is different from the predetermined value stored in the predetermined value storing part 256, but the difference computed by the computing part 253 is the same as the predetermined value stored in the predetermined value storing part 256. In this case, the detector 254 judges, based on the judgment table 258, that the change in the deflection angle is generated, but no phase error is generated. Hence, the corrector 255 performs only the correction of the change in the deflection angle amounting to one pixel.

FIG. 16 is a diagram illustrating a fourth example of the correction method performed by the horizontal correction circuit.

FIG. 16 illustrates an example of a case in which a phase error amounting to one pixel and a change in the deflection angle amounting to one pixel are generated. In this example, the first pixel count value is "502", and the second pixel count value is "504". In this case, the computing part 253 computes the sum of the first and second pixel count values, which is "1006". In addition, the computing part 253 computes the difference of the first and second pixel count values, which is "−2". In other words, the sum computed by the computing part 253 is different from the predetermined value stored in the predetermined value storing part 256, and the difference computed by the computing part 253 is the different from the predetermined value stored in the predetermined value storing part 256. In this case, the detector 254 judges, based on the judgment table 258, that both the change in the deflection angle and the phase error are generated. Hence, the corrector 255 performs the correction of both the phase error amounting to one pixel, and the change in the deflection angle amounting to one pixel.

According to this embodiment, the sum and the difference of the first pixel count value and the second pixel count value are computed, and the deviations of the sum and the difference from the respective predetermined values are detected, to detect the generation of the phase error and the change in the deflection angle. Hence, the image projection apparatus 100 in this embodiment need only preset the respective predetermined values of at least the sum and the difference, and the change in the deflection angle in the horizontal scanning direction of the MEMS mirror 310 and the phase error can be detected and corrected using a relatively simple structure.

In addition, the optical sensor 600 in this embodiment is provided with two light receiving regions that partially overlap in the vertical scanning direction. According to this structure in this embodiment, the change in the deflection angle in the vertical scanning direction can be detected and corrected, based on the relationship of the number of times the reference light beam is detected by the photodiode 610 and the expected value corresponding to the photodiode 610, and the relationship of the number of times the reference light beam is detected by the photodiode 620 and the expected value corresponding to the photodiode 620. According to this embodiment, the changes in the deflection angles in the vertical scanning direction and the horizontal scanning direction of the MEMS mirror 310 can be detected and corrected using a relatively simple structure.

Therefore, this embodiment can improve the accuracy of the irradiating position of the laser beam.

Second Embodiment

Next, a second embodiment will be described by referring to the drawings. The second embodiment differs from the first embodiment in that the functions of the system controller 210 are performed by a MEMS controller and a CPU in this second embodiment. Accordingly, a description will be given of those parts of the second embodiment that differ from the corresponding parts of the first embodiment. Those parts of the second embodiment that are the same as those corresponding parts of the first embodiment are designated by the same reference numerals, and a description thereof will be omitted.

Figure 17:
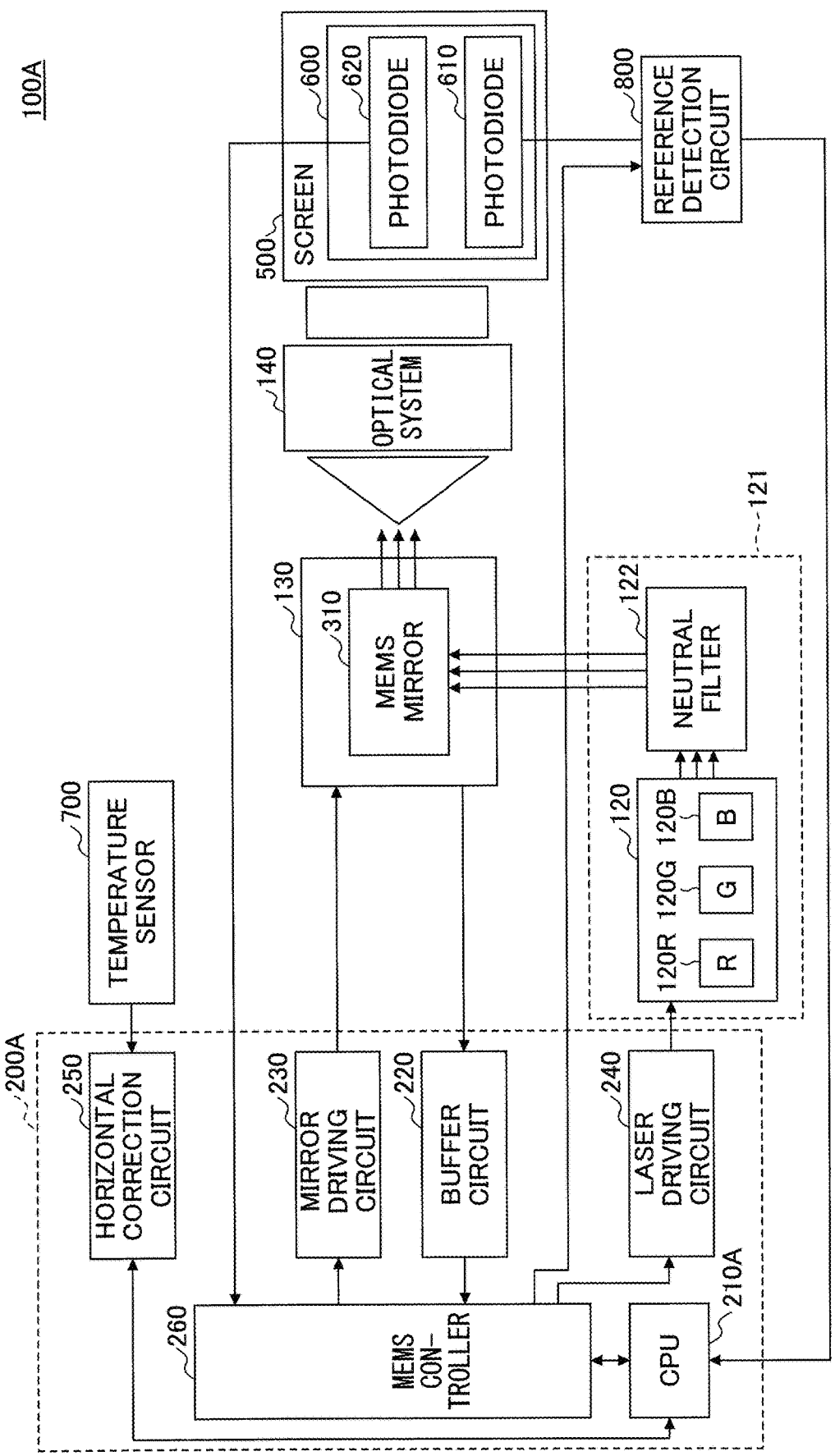
FIG. 17 is a diagram illustrating the structure of an example of the image projection apparatus in a second embodiment.

FIG. 17 is a diagram illustrating the structure of an example of the image projection apparatus in the second embodiment.

An image projection apparatus 100A in this embodiment includes a circuit part 200A, the light source module 121, the optical scan module 130, the optical system 140, the screen 500, the optical sensor 600, the temperature sensor 700, and a reference detection circuit 800.

The circuit part 200A includes a CPU 210A, the buffer circuit 220, the mirror driving circuit 230, the laser driving circuit 240, the horizontal correction circuit 250, and a MEMS controller 260.

The CPU 210A controls the MEMS controller 260. More particularly, the CPU 210A performs a process to correct the deflection angle in the vertical scanning direction of the MEMS mirror 310, based on a signal output from the reference detection circuit 800. The process to correct the deflection angle in the vertical scanning direction of the MEMS mirror 310 is the same as the process performed by the system controller 210 in the first embodiment.

In addition, in this embodiment, a result of correcting the deflection angle in the vertical scanning direction of the MEMS mirror 310, and a result of correcting the deflection angle in the horizontal scanning direction of the MEMS mirror 310 and the phase error by the horizontal correction circuit 250, are notified to the MEMS controller 260.

The MEMS controller 260 controls the mirror driving circuit 230, and the laser driving circuit 240. In addition, the MEMS controller 260 controls driving of the MEMS mirror 310, based on results of various kinds of corrections notified from the CPU 210A. Further, the MEMS controller 260 instructs the mirror driving circuit 230 and the laser driving circuit 240 to irradiate the reference light beam, and outputs a signal, indicating the instruction to irradiate the reference light beam, to the reference detection circuit 800.

The reference detection circuit 800 outputs, to the CPU 210A, the signal output from the photodiode 610 as a timing signal detectable by the CPU 210A, based on the signal output from the MEMS controller 260 and the signal output from the photodiode 610. Details of the reference detection circuit 800 will be described later.

In the image projection apparatus 100A in this embodiment, the signal output from the photodiode 610 is input to the reference detection circuit 800, and the signal output from the reference detection circuit 800 is supplied to the CPU 210A. In addition, in the image projection apparatus 100A in this embodiment, the signal output from the photodiode 620 is input to the MEMS controller 260.

Figure 18:
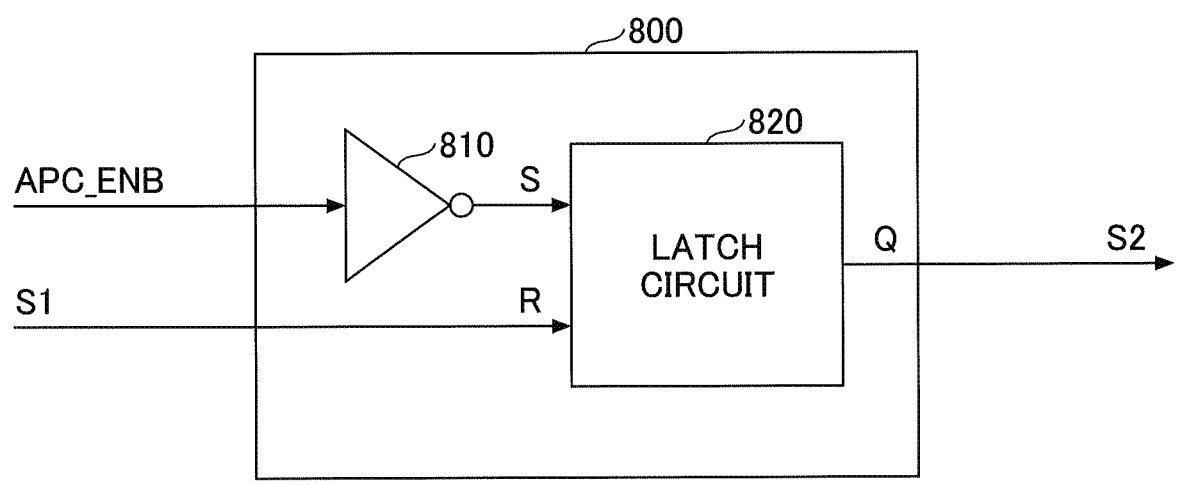
FIG. 18 is a diagram for explaining a reference detection circuit in the second embodiment.

Next, the reference detection circuit 800 in this embodiment will be described, by referring to FIG. 18. FIG. 18 is a diagram for explaining the reference detection circuit in the second embodiment.

The reference detection circuit 800 in this embodiment includes an inverter 810, and a latch circuit 820. The latch circuit 820 may be a R-S(Reset-Set) type latch circuit having a set terminal S, a reset terminal R, and an output terminal Q.

In the reference detection circuit 800 in this embodiment, a signal APC_ENB output from the MEMS controller 260 is input to the inverter 810. The signal APC_ENS notifies the irradiation of the reference light beam.

An output signal of the inverter 810 and a signal S1 output from the photodiode 610 are input to the set terminal S and the reset terminal R of the latch circuit 820, respectively. A signal S2 output from the output terminal Q of the latch circuit 820 is supplied to the CPU 210A.

Figure 19:
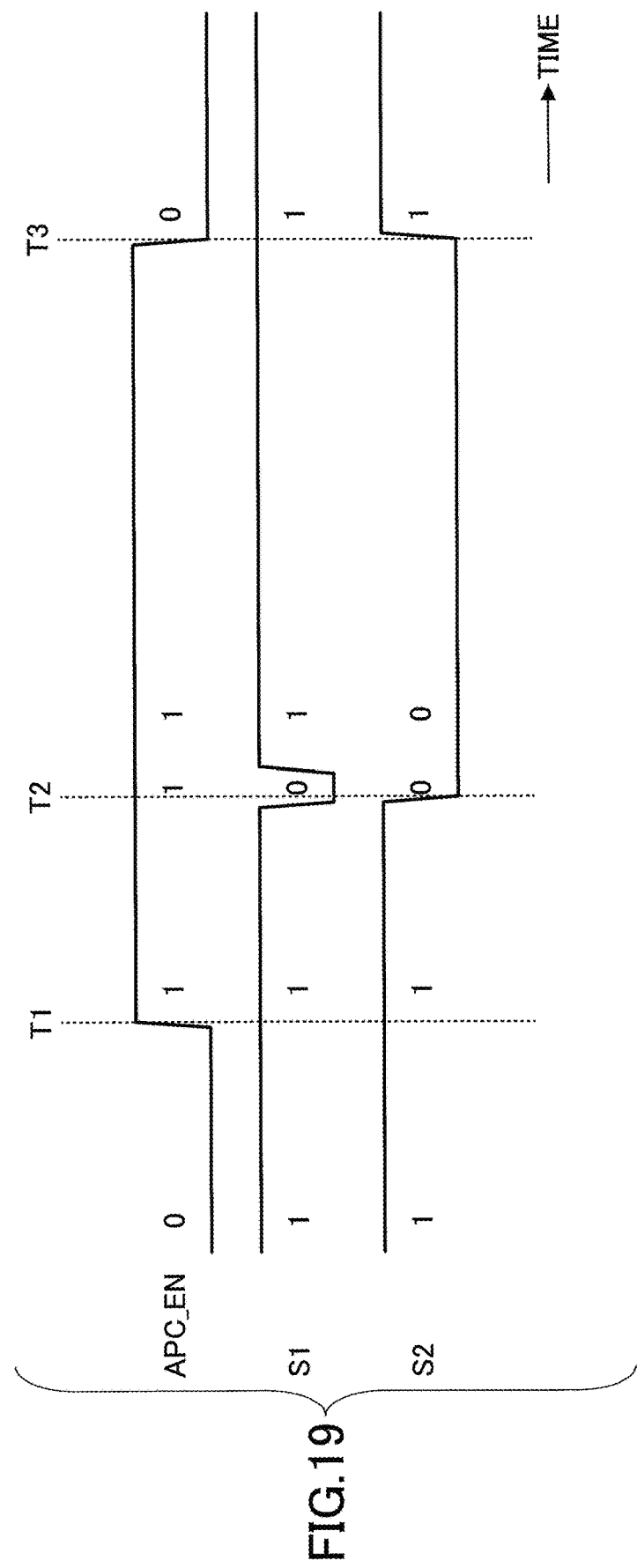
FIG. 19 is a timing chart illustrating an example of an operation of the reference detection circuit.

Next, an operation of the reference detection circuit 800 in this embodiment will be described, by referring to FIG. 19. FIG. 19 is a timing chart illustrating an example of the operation of the reference detection circuit.

In the example illustrated in FIG. 19, the signal APC_ENB is inverted from a low level to a high level at a timing T1, and is inverted from the high level to the low level at a timing T3. In other words, FIG. 19 indicates that the reference light beam is irradiated during a time from the timing T1 to the timing T3.

At the timing T1, the signal S1 remains at a high level, and the photodiode 610 does not detect the reference light beam at the timing T1. Accordingly, at the timing T1, the signal S2 also remains at a high level At a timing T2 when the photodiode 610 detects the reference light beam, the signal S1 output from the photodiode 610 is inverted from the high level to the low level. Further, when the scanning of the photodiode 610 by the reference light beam ends, the signal S1 is inverted from the low level to the high level, and maintains the high level.

At the timing T2 when the signal S1 makes the transition to the low level, the signal S2 output from the latch circuit 820 is inverted from the high level to the low level. In addition, when the signal APC_ENB is inverted from the high level to the low level at a timing T3, the signal S2 is inverted from the low level to the high level.

Accordingly, the output signal S2 of the reference detection circuit 800 is maintained to the low level while the reference light beam is irradiated. In other words, the reference detection circuit 800 is an example of a latch circuit part that maintains the signal S2 to the same level as the output signal S1 of the photodiode 610 while the reference light beam is irradiated from a time when the reference light beam is detected by the photodiode 610.

The CPU 210A counts the number of times the signal S2 output from the reference detection circuit 800 assumes the low level, as the number of times the reference light beam is detected by the photodiode 610. Hence, in this embodiment, even when a resolution of the CPU 210A is lower than that of the MEMS controller 260, the CPU 210A can detect the number of times the reference light beam scans the photodiode 610.

Accordingly, in this embodiment, the CPU 210A can perform the process to correct the deflection angle in the vertical scanning direction of the MEMS mirror 310.

In this embodiment, the signal S1 output from the photodiode 610 is held by the latch circuit 820, however, the signal S1 may be held by other circuitry or means. For example, the signal S1 output from the photodiode 610 may be held in a register (not illustrated) of the MEMS controller 260.

In this case, the MEMS controller 260 may hold the signal S1 in the register until a next signal S1 indicating a next detection of the reference light beam by the photodiode 610 is received from the photodiode 610. In addition, the MEMS controller 260 may hold the signal S1 during a time until the information in the register is read. The time until the information in the register of the MEMS controller 260 is read refers to a time while the reference light beam is irradiated from a time when the reference light beam is detected by the photodiode 610.

Moreover, in this embodiment, the structure can further be simplified when the signal S1 is held in the MEMS controller 260, because it becomes unnecessary to provide the reference detection circuit 800.

According to each of the embodiments described above, it is possible to provide an image projection apparatus and an image projection method, which can improve the accuracy of the irradiating position of the laser beam.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," and "second," the ordinal numbers do not imply priorities of the embodiments.

Further, the present invention is not limited to these embodiments, but various variations and modifications may be made without departing from the scope of the present invention. For example, the various variations and modifications may be made according to applications of the present invention.

What is claimed is:

1. An image projection apparatus comprising:
   a light irradiation device configured to irradiate a laser beam;
   an optical scan device configured to deflect the laser beam to make an optical scan, and project an image on a display region;
   an optical sensor arranged outside the display region, and including a first light receiving region and a second light receiving region that are arranged at different positions along a vertical scanning direction of the optical scan; and
   a deflection angle controller configured to correct a deflection angle in the vertical scanning direction of the optical scan device, by a correction method corresponding to each of combinations of a result of comparing a number of times the laser beam is detected by the first light receiving region and an expected value corresponding to the first light receiving region and a result of comparing a number of times the laser beam is detected by the second light receiving region and an expected value corresponding to the second light receiving region.

2. The image projection apparatus as claimed in claim 1, wherein the first light receiving region and the second light receiving region are arranged at positions continuous along the vertical scanning direction.

3. The image projection apparatus as claimed in claim 2, wherein the first light receiving region and the second light receiving region are arranged at positions that partially overlap along the vertical scanning direction.

4. The image projection apparatus as claimed in claim 1, further comprising:
   a storage device configured to store information including combinations of a relationship of the number of times the laser beam is detected by the first light receiving region and the expected value corresponding to the first light receiving region, and a relationship of the number of times the laser beam is detected by the second light receiving region and the expected value corresponding to the second light receiving region, and the correction method for each of the combinations, in correspondence with each other,
   wherein the deflection angle controller corrects the deflection angle in the vertical scanning direction of the optical scan device by referring to the information stored in the storage device.

5. The image projection apparatus as claimed in claim 1, further comprising:
   a detector configured to detect a phase error in a horizontal scanning direction of the laser beam and a change in a deflection angle in the horizontal scanning direction of the optical scan device, according to a deviation of a first pixel detected by the second light receiving region from a first predetermined value while the laser beam performs a horizontal scan in a first direction, and a deviation of a second pixel detected by the second light receiving region from a second predetermined value while the laser beam performs the horizontal scan in a second direction opposite to the first direction; and a corrector configured to correct each of the phase error and the change in the deflection angle in the horizontal scanning direction detected by the detector.

6. The image projection apparatus as claimed in claim 5, wherein the corrector corrects the phase error and the change in the deflection angle in the horizontal scanning direction, after the deflection angle controller corrects the deflection angle in the vertical scanning direction.

7. The image projection apparatus as claimed in claim 5, wherein the second light receiving region includes a third light receiving region and a fourth light receiving region that are arranged adjacent to each other in the horizontal scanning direction, and the optical sensor outputs a signal indicating detection of the first pixel and the second pixel when the laser beam scans a boundary between the third light receiving region and the fourth light receiving region.

8. The image projection apparatus as claimed in claim 1, further comprising:

a holding part configured to hold a result of a detection signal output from the first light receiving region and indicating detection of the laser beam by the first light receiving region, wherein the deflection angle controller acquires the number of times the laser beam is detected by the first light receiving region, based on the result of the detection signal held by the holding part.

9. The image projection apparatus as claimed in claim 8, wherein the holding part includes a latch circuit part, the latch circuit part holds the result of the detection signal until irradiation of the laser beam stops, and the number of times the laser beam is detected by the first light receiving region is based on a signal output from the latch circuit part.

10. An image projection apparatus comprising:

a light irradiation device configured to irradiate a laser beam;

an optical scan device configured to deflect the laser beam to make an optical scan, and project an image on a display region;

an optical sensor arranged outside the display region, and including a first light receiving region and a second light receiving region that are arranged at different positions along a vertical scanning direction of the optical scan;

a storage device configured to store a program; and a processor configured to execute the program and perform a process including correcting a deflection angle in the vertical scanning direction of the optical scan device, by a correction method corresponding to each of combinations of a result of comparing a number of times the laser beam is detected by the first light receiving region and an expected value corresponding to the first light receiving region, and a result of comparing a number of times the laser beam is detected by the second light receiving region and an expected value corresponding to the second light receiving region.

11. The image projection apparatus as claimed in claim 10, wherein the first light receiving region and the second light receiving region are arranged at positions continuous along the vertical scanning direction.

12. The image projection apparatus as claimed in claim 11, wherein the first light receiving region and the second light receiving region are arranged at positions that partially overlap along the vertical scanning direction.

13. The image projection apparatus as claimed in claim 10, wherein the storage device stores information including combinations of a relationship of the number of times the laser beam is detected by the first light receiving region and the expected value corresponding to the first light receiving region, and a relationship of the number of times the laser beam is detected by the second light receiving region and the expected value corresponding to the second light receiving region, and the correction method for each of the combinations, in correspondence with each other, and the processor corrects the deflection angle in the vertical scanning direction of the optical scan device by referring to the information stored in the storage device.

14. The image projection apparatus as claimed in claim 10, wherein the processor performs the process further including detecting a phase error in a horizontal scanning direction of the laser beam and a change in a deflection angle in the horizontal scanning direction of the optical scan device, according to a deviation of a first pixel detected by the second light receiving region from a first predetermined value while the laser beam performs a horizontal scan in a first direction, and a deviation of a second pixel detected by the second light receiving region from a second predetermined value while the laser beam performs the horizontal scan in a second direction opposite to the first direction, and correcting each of the phase error and the change in the deflection angle in the horizontal scanning direction detected by the detecting.

15. The image projection apparatus as claimed in claim 14, wherein the correcting each of the phase error and the change in the deflection angle in the horizontal scanning direction corrects the phase error and the change in the deflection angle in the horizontal scanning direction, after the correcting the deflection angle in the vertical scanning direction of the optical scan device corrects the deflection angle in the vertical scanning direction.

16. The image projection apparatus as claimed in claim 14, wherein the second light receiving region includes a third light receiving region and a fourth light receiving region that are arranged adjacent to each other in the horizontal scanning direction, and the optical sensor outputs a signal indicating detection of the first pixel and the second pixel when the laser beam scans a boundary between the third light receiving region and the fourth light receiving region.

17. The image projection apparatus as claimed in claim 10, wherein the processor performs the process further including holding a result of a detection signal output from the first light receiving region and indicating detection of the laser beam by the first light receiving region, wherein the correcting the deflection angle in the vertical scanning direction of the optical scan device acquires the number of times the laser beam is detected by the first light receiving region, based on the result of the detection signal held by the holding.

18. The image projection apparatus as claimed in claim 17, wherein
the holding holds the result of the detection signal in a latch circuit part until irradiation of the laser beam stops, and
the number of times the laser beam is detected by the first light receiving region is based on a signal output from the latch circuit part.

19. An image projection method comprising:
irradiating, by a light irradiation device, a laser beam;
deflecting, by an optical scan device, the laser beam to make an optical scan, and project an image on a display region; and
correcting, by a deflection angle controller, a deflection angle in a vertical scanning direction of the optical scan device, by a correction method corresponding to each of combinations of a result of comparing a number of times the laser beam is detected by a first light receiving region of an optical sensor arranged outside the display region and an expected value corresponding to the first light receiving region, and a result of comparing a number of times the laser beam is detected by a second light receiving region of the optical sensor and an expected value corresponding to the second light receiving region, wherein the first light receiving region and the second light receiving region are arranged at different positions along the vertical scanning direction.

20. The image projection method as claimed in claim 19, further comprising:
detecting, by a detector, a phase error in a horizontal scanning direction of the laser beam and a change in a deflection angle in the horizontal scanning direction of the optical scan device, according to a deviation of a first pixel detected by the second light receiving region from a first predetermined value while the laser beam performs a horizontal scan in a first direction, and a deviation of a second pixel detected by the second light receiving region from a second predetermined value while the laser beam performs the horizontal scan in a second direction opposite to the first direction; and
correcting, by a corrector, each of the phase error and the change in the deflection angle in the horizontal scanning direction detected by the detecting.

21. The image projection apparatus as claimed in claim 1, wherein the first light receiving region and the second light receiving region of the optical sensor are arranged in a blanking area outside the display region, at positions that are different along the vertical scanning direction and are adjacent to each other in a horizontal scanning direction of the optical scan.

22. The image projection apparatus as claimed in claim 10, wherein the first light receiving region and the second light receiving region of the optical sensor are arranged in a blanking area outside the display region, at positions that are different along the vertical scanning direction and are adjacent to each other in a horizontal scanning direction of the optical scan.

23. The image projection method as claimed in claim 19, wherein the correcting uses the optical sensor having the first light receiving region and the second light receiving region that are arranged in a blanking area outside the display region, at positions that are different along the vertical scanning direction and are adjacent to each other in a horizontal scanning direction of the optical scan.

* * * * *